United States Patent
Huang et al.

(10) Patent No.: US 11,743,755 B2
(45) Date of Patent: Aug. 29, 2023

(54) METHOD AND APPARATUS FOR UE LOCATION REPORT IN A WIRELESS COMMUNICATION SYSTEM

(71) Applicant: ASUSTek Computer Inc., Taipei (TW)

(72) Inventors: Yi-Hsuan Huang, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/948,522

(22) Filed: Sep. 20, 2022

(65) Prior Publication Data

US 2023/0109017 A1    Apr. 6, 2023

Related U.S. Application Data

(60) Provisional application No. 63/287,928, filed on Dec. 9, 2021, provisional application No. 63/251,927, filed on Oct. 4, 2021.

(51) Int. Cl.
 *H04W 24/10*   (2009.01)
 *G01S 5/00*    (2006.01)

(52) U.S. Cl.
 CPC .......... *H04W 24/10* (2013.01); *G01S 5/0063* (2013.01)

(58) Field of Classification Search
 CPC .................. H04W 24/10; G01S 5/0063
 See application file for complete search history.

(56) References Cited

U.S. PATENT DOCUMENTS

| | | | |
|---|---|---|---|
| 9,826,448 B2 | 11/2017 | Le et al. | |
| 2022/0417780 A1* | 12/2022 | Liu | ........................ H04W 24/10 |
| 2023/0031500 A1* | 2/2023 | Hu | ..................... H04W 36/0094 |
| 2023/0080009 A1* | 3/2023 | Wang | .................... H04W 24/08 |
| | | | 370/252 |

FOREIGN PATENT DOCUMENTS

| | | |
|---|---|---|
| EP | 2876925 A1 | 5/2015 |
| EP | 3142399 A1 | 3/2017 |
| WO | 2021062729 A1 | 4/2021 |

OTHER PUBLICATIONS

Ericsson: "Stage-3 running RRC CR for NTN Rel-17", 3GPP Draft; R2-2108345, 3rd Generation Partnership Project (3GPP), Mobile Competence Centre, Aug. 6, 2021, 940 pages.

Extended European Search Report to the corresponding European Patent Application rendered by the European Patent Office (EPO) dated Feb. 10, 2023, 10 pages.

* cited by examiner

*Primary Examiner* — Chuong A Ngo

(74) *Attorney, Agent, or Firm* — Skaar Ulbrich Macari, P.A.

(57) ABSTRACT

Methods, systems, and apparatuses are provided for User Equipment (UE) location reporting in a wireless communication system to facilitate efficiency in measurement reporting in Non-Terrestrial Networks (NTNs). A method for a UE in a wireless communication system comprises receiving a first configuration to trigger measurement reporting based on a first event that distance between the UE and a first reference location of a serving cell becomes larger than a distance threshold and distance between the UE and a second reference location of a first neighbor cell becomes shorter than another distance threshold, and triggering a first measurement report based on the first event, wherein measured radio condition of the first neighbor cell is omitted or not included in the first measurement report.

20 Claims, 10 Drawing Sheets

METHOD AND APPARATUS FOR UE LOCATION REPORT IN A WIRELESS COMMUNICATION SYSTEM

CROSS-REFERENCE TO RELATED APPLICATIONS

The present application claims priority to and the benefit of U.S. Provisional Patent Application Ser. No. 63/251,927, filed Oct. 4, 2021, and U.S. Provisional Patent Application Ser. No. 63/287,928, filed Dec. 9, 2021; with each of the referenced applications and disclosures fully incorporated herein by reference.

FIELD

This disclosure generally relates to wireless communication networks and, more particularly, to a method and apparatus for User Equipment (UE) location reporting in a wireless communication system to facilitate efficiency in location information reporting in Non-Terrestrial Networks (NTNs).

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for User Equipment (UE) location reporting in a wireless communication system to facilitate efficiency in measurement reporting in Non-Terrestrial Networks (NTNs).

In various embodiments, with this and other concepts, systems, and methods of the present invention, a method for a UE in a wireless communication system comprises receiving a first configuration to trigger measurement reporting based on a first event that distance between the UE and a first reference location of a serving cell becomes larger than a distance threshold and distance between the UE and a second reference location of a first neighbor cell becomes shorter than another distance threshold, and triggering a first measurement report based on the first event, wherein measured radio condition of the first neighbor cell is omitted or not included in the first measurement report.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] RP-201256, "Solutions for NR to support non-terrestrial networks (NTN)"; [2] 3GPP TS 38.331 V16.5.0, "NR, RRC protocol specification"; [3] R2-2111614, "Stage-3 running RRC CR for NTN Rel-17"; [4] RP-211774, "Status Report to TSG"; [5] 3GPP TR 38.821 V16.0.0, "Solutions for NR to support non-terrestrial networks (NTN)"; [6] R2-2011041, "Reply LS on SA WG2 assumptions from conclusion of study on architecture aspects for using satellite access in 5G"; [7] R2-2111221, "LS on UE TA reporting"; [8] R2-2111333, "[116-e][103][NTN] SMTC/gaps (Nokia)"; and [9] RP-212803, "Status report WI NR-NTN-solutions". The standards and documents listed above are hereby expressly and fully incorporated herein by reference in their entirety.

Figure 1:
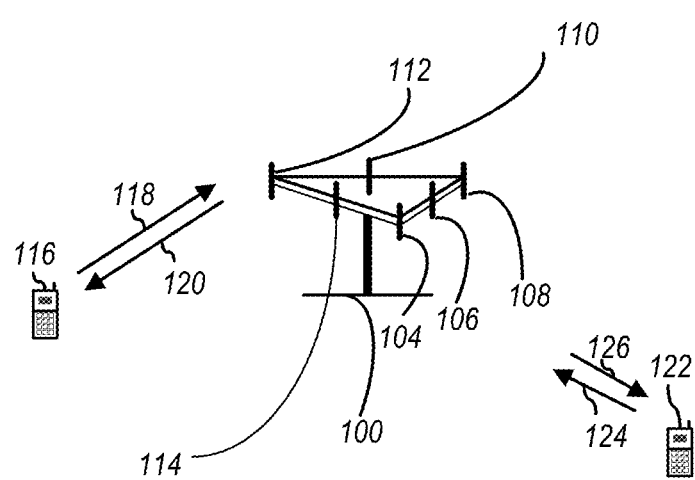
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
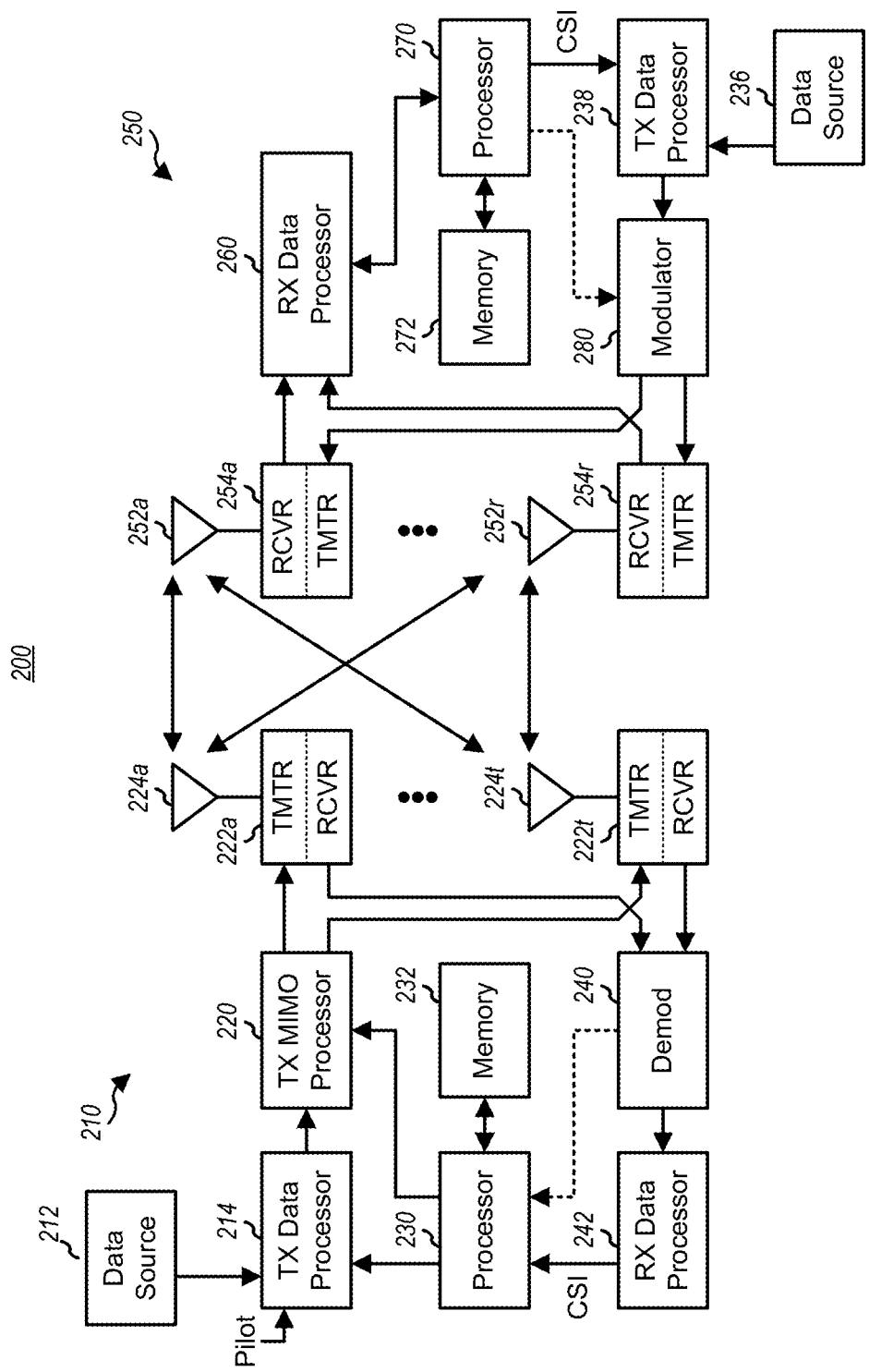
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
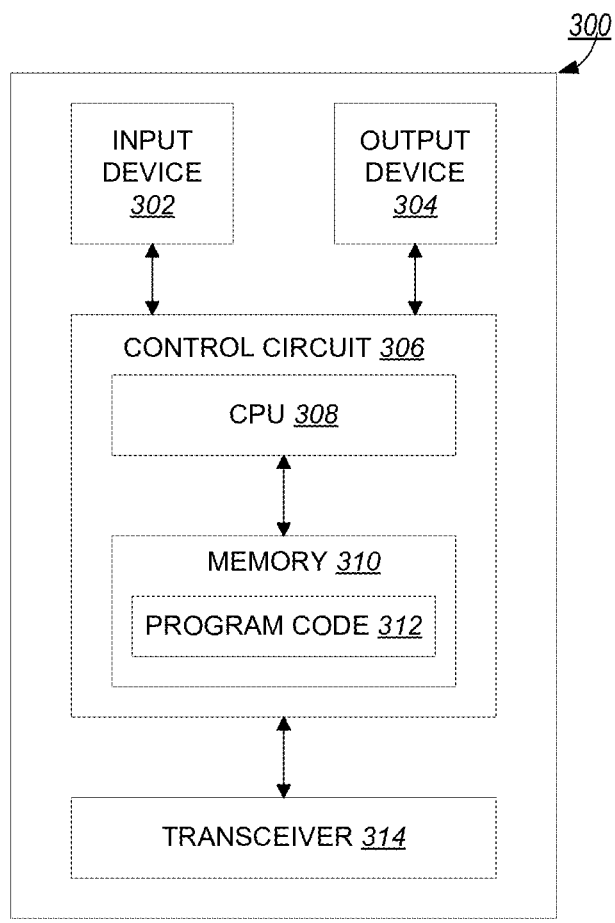
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
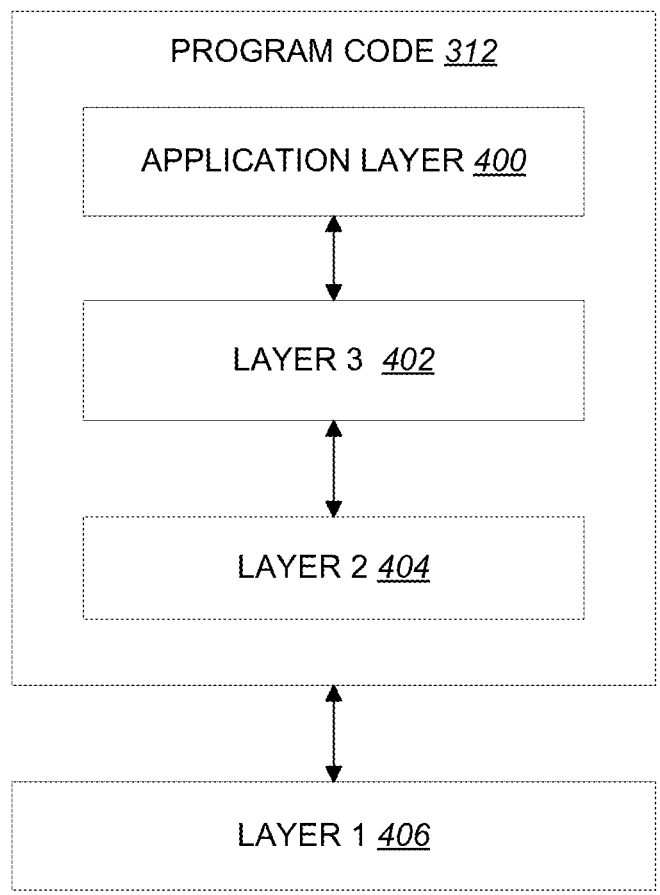
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

The description of the work item of non-terrestrial networks (NTN) in NR is specified in [1] RP-201256, "Solutions for NR to support non-terrestrial networks (NTN)":

```
************************************* Quotation Start [1] *************************************
4         Objective
4.1.2     RAN2
[...]
The following control plane procedures enhancements should be specified (see TR 38.821)
    Idle mode:
        Definition of additional assistance information for cell selection/reselection (e.g. using UE location
        information, satellite Ephemeris information)
        Definition of NTN (satellite/HAPS) cell specific information in SIB
    Connected mode
        Enhancement necessary to take into account location information (UE & Satellite/HAPS) and/or
        ephemeris in determining when to perform hand-over, in order to have a high degree of hand-over
        control for hand-over robustness and coverage management.
        Enhancement to existing measurement configurations to address absolute propagation delay difference
        between satellites (e.g. SMTC measurement gap adaptation to the SSB/CSI-RS measurement window)
        [RAN2/4].
    Service continuity for mobility from TN to NTN and from NTN to TN systems (to be addressed when connected
    mode mobility has sufficiently progressed)
    Identify potential issues associated to the use of the existing Location Services (LCS) application protocols to
    locate UE in the context of NTN and specify adaptations if any [RAN2/3]
************************************* Quotation End *************************************
The measurement report and related configurations are specified in [2] 3GPP TS 38.331 V16.5.0, "NR, RRC
protocol specification" as below:
************************************* Quotation Start [2] *************************************
```

5.5 Measurements
5.5.1 Introduction
The network may configure an RRC_CONNECTED UE to perform measurements. The network may configure the UE to report them in accordance with the measurement configuration or perform conditional reconfiguration evaluation in accordance with die conditional reconfiguration. The measurement configuration is provided by means of dedicated signalling i.e. using the RRCReconfiguration or RRCResume.
The network may configure the UE to perform the following types of measurements:
   NR measurements:
   Inter-RAT measurements of E-UTRA frequencies.
   Inter-RAT measurements of UTRA-FDD frequencies.
The network may configure the UE to report the following measurement information based on SS/PBCH block(s):
   Measurement results per SS/PBCH block;
   Measurement results per cell based on SS/PBCH block(s);
   SS/PBCH block(s) indexes.
The network may configure the UE to report the follow ing measurement information based on CSI-RS resources:
   Measurement results per CSI-RS resource;
   Measurement results per cell based on CSI-RS resource(s);
   CSI-RS resource measurement identifiers.
[ . . . ]
The measurement configuration includes the following parameters:
   1. Measurement objects: A list of objects on which the UE shall perform the measurements.
      For inlra-frequency and inter-frequency measurements a measurement object indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

The measObjectId of the MO which corresponds to each serving cell is indicated by senvingCellMO within the serving cell configuration.

For inter-RAT E-UTRA measurements a measurement object is a single E-UTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

For inter-RAT UTRA-FDD measurements a measurement object is a set of cells on a single UTRA-FDD carrier frequency.

For CBR measurement of NR sidelink communication, a measurement object is a set of transmission resource pool(s) on a single carrier frequency for NR sidelink communication.

For CLI measurements a measurement object indicates the frequency/time location of SRS resources and/or CLI-RSSI resources, and subcarrier spacing of SRS resources to be measured.

2. Reporting configurations: A list of reporting configurations where there can be one or multiple reporting configurations per measurement object. Each measurement reporting configuration consists of the following:

Reporting criterion: The criterion that triggers the UE to send a measurement report. This can either be periodical or a single event description.

RS type: The RS that the UE uses for beam and cell measurement results (SS/PBCH block or CSI-RS).

Reporting format: The quantities per cell and per beam that the UE includes in the measurement report (e.g. RSRP) and other associated information such as the maximum number of cells and the maximum number beams per cell to report.

In case of conditional reconfiguration, each configuration consists of the following:

Execution criteria: The criteria the UE uses for conditional reconfiguration execution.

RS type: The RS that the UE uses for obtaining beam and cell measurement results (SS/PBCH block-based or CSI-RS-based), used for evaluating conditional reconfiguration execution condition.

3. Measurement identities: For measurement reporting, a list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network. For conditional reconfiguration triggering, one measurement identity links to exactly one conditional reconfiguration trigger configuration. And up to 2 measurement identities can be linked to one conditional reconfiguration execution condition.

4. Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

5. Measurement gaps: Periods that the UE may use to perform measurements.

A UE in RRC_CONNECTED maintains a measurement object list, a reporting configuration list, and a measurement identities list according to signalling and procedures in this specification. The measurement object list possibly includes NR measurement object(s), CLI measurement object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures distinguish the following types of cells:

1. The NR serving cell(s)—these are the SpCell and one or more SCells.
2. Listed cells—these are cells listed within the measurement object(s).
3. Detected cells—these are cells that are not listed within the measurement objcct(s) but are detected by the UE on the SSB frequency(ies) and subcarrier spacing(s) indicated by the measurement object(s).

For NR measurement object(s), the UE measures and reports on the serving cell(s), listed cells and/or detected cells. For inter-RAT measurements object(s) of E-UTRA, the UE measures and reports on listed cells and delected cells and, for RSSI and channel occupancy measurements, the UE measures and reports on the configured resources on the indicated frequency. For inter-RAT measurements object(s) of UTRA-FDD, the UE measures and reports on listed cells. For CLI measurement object(s), the UE measures and reports on configured measurement resources (i.e. SRS resources and/or CLI-RSSI resources).

Whenever the procedural specification, other than contained in sub-clause 5.5.2, refers to a field it concerns a field included in the VarMeasConfig unless explicitly stated otherwise i.e. only the measurement configuration procedure covers the direct UE action related to the received measConfig.

\*\*\* Next Quotation \*\*\*

5.5.3 Performing measurements 5.5.3.1 General

An RRC_CONNECTED UE shall derive cell measurement results by measuring one or multiple beams associated per cell as configured by die network, as described in 5.5.3.3. For all cell measurement results, except for RSSI. and CLI measurement results in RRC_CONNECTED, the UE applies the layer 3 filtering as specified in 5.S.3.2, before using the measured results for evaluation of reporting criteria, measurement reporting or the criteria to trigger conditional reconfiguration execution. For cell measurements, the network can configure RSRP, RSRQ, SINR, RSCP or EcN0 as trigger quantity. For CLI measurements, the network can configure SRS-RSRP or CLI-RSSI as trigger quantity. For cell and beam measurements, reporting quantities can be any combination of quantities (i.e. only RSRP: only RSRQ; only SINR; RSRP and RSRQ; RSRP and SINR; RSRQ and SINR; RSRP, RSRQ and SINR; only RSCP; only EcN0; RSCP and EcN0), irrespective of the trigger quantity, and for CLI measurements, reporting quantities can be either SRS-RSRP or CLI-RSSI. For conditional reconfiguration execution, the network can configure up to 2 quantities, both using same RS type. The UE does not apply the layer 3 filtering as specified in 5.5.3.2 to derive the CBR measurements.

The network may also configure the UE to report measurement information per beam (which can either be measurement results per beam with respective beam identifier(s) or only beam identifier(s)), derived as described in 5.5.3.3a. If beam measurement information is configured to be included in measurement reports, the UE applies the layer 3 beam filtering as specified in 5.5.3.2. On the other hand, the exact L1 filtering of beam measurements used to derive cell measurement results is implementation dependent.

The UE shall:

> 1> whenever the UE has a measConfig, perform RSRP and RSRQ measurements for each serving cell for which servingCellMO is configured as follows:
>> 2> if the reportConfig associated with at least one measId included in the measIdList within VarMeasConfig contains an rsType set to ssb and ssb-ConfigMobility is configured in the measObject indicated by the servingCellMO:
>>> 3> if the reportConfig associated with at least one measId included in the measIdList within VarMeasConfig contains a reportQuantityRS-Indexes and maxNrofRS-IndexesToReport and contains an rsType set to ssb:
>>>> 4> derive layer 3 filtered RSRP and RSRQ per beam for the serving cell based on SS/PBCH block, as described in 5.5.3.3a;
>>> 3> derive serving cell measurement results based on SS/PBCH block, as described in 5.5.3.3;
>> 2> if the reportConfig associated with at least one measId included in the measIdList within VarMeasConfig contains an rsType set to csi-rs and CSI-RS-ResourceConfigMobility is configured in the measObject indicated by the servingCellMO:
>>> 3> if the reportConfig associated with at least one measId included in the measIdList within VarMeasConfig contains a reportQuantityRS-Indexes and maxNrofRS-IndexesToReport and contains an rsType set to csi-rs:
>>>> 4> derive layer 3 filtered RSRP and RSRQ per beam for the serving cell based on CSI-RS, as described in 5.5.3.3a;
>>> 3> derive serving cell measurement results based on CSI-RS, as described in 5.5.3.3;
> 1> for each serving cell for which servingCellMO is configured, if the reportConfig associated with at least one measId included in the measIdList within VarMeasConfig contains SINR as trigger quantity and/or reporting quantity:
>> 2> if the reportConfig contains rsType set to ssb and ssb-ConfigMobility is configured in the servingCellMO:
>>> 3> if the reportConfigcontains a reportQuantityRS-Indexes and maxNrofRS-IndexesToReport:
>>>> 4> derive layer 3 filtered SINR per beam for the serving cell based on SS/PBCH block, as described in 5.5.3.3a;
>>> 3> derive serving cell SINR based on SS/PBCH block, as described in 5.5.3.3;
>> 2> if the reportConfig contains rsType set to csi-rs and CSI-RS-ResourceConfigMobility is configured in the servingCellMO:
>>> 3> if the reportConfigcontains a reportQuantityRS-Indexes and maxNrofRS-IndexesToReport:
>>>> 4> derive layer 3 filtered SINR per beam for the serving cell based on CSI-RS, as described in 5.5.3.3a;
>>> 3> derive serving cell SINR based on CSI-RS, as described in 5.5.3.3;
> 1> for each measId included in the measIdList within VarMeasConfig:
> [...]
>> 2> if the reportType for the associated reportConfig is periodical, eventTriggered or condTriggerConfig:
>>> 3> if a measurement gap configuration is setup, or
>>> 3> if the UE does not require measurement gaps to perform the concerned measurements:
>>>> 4> if s-MeasureConfig is not configured, or
>>>> 4> if s-MeasureConfig is set to ssb-RSRP and the NR SpCell RSRP based on SS/PBCH block, after layer 3 filtering, is lower than ssb-RSRP, or
>>>> 4> if s-MeasureConfig is set to csi-RSRP and the NR SpCell RSRP based on CSI-RS, after layer 3 filtering, is lower than csi-RSRP:
>>>>> 5> if the measObject is associated to NR and the rsType is set to csi-rs:
>>>>>> 6> if reportQuantityRS-Indexes and maxNrofRS-IndexesToReport for the associated reportConfig are configured:
>>>>>>> 7> derive layer 3 filtered beam measurements only based on CSI-RS for each measurement quantity indicated in reportQuantityRS-Indexes, as described in 5.5.3.3a;
>>>>>> 6> derive cell measurement results based on CSI-RS for the trigger quantity and each measurement quantity indicated in reportQuantityCell using parameters from the associated measObject, as described in 5.5.3.3;
>>>>> 5> if the measObject is associated to NR and the rsType is set to ssb:
>>>>>> 6> if reportQuantityRS-Indexes and maxNrofRS-IndexesToReport for the associated reportConfig are configured:
>>>>>>> 7> derive layer 3 beam measurements only based on SS/PBCH block for each measurement quantity indicated in reportQuantityRS-Indexes, as described in 5.5.3.3a;

```
                    6>  derive cell measurement results based on SS/PBCH block for the trigger quantity and each
                        measurement quantity indicated in reportQuantityCell using parameters from the associated
                        measObject, as described in 5.5.3.3;
                5>  if the measObject is associated to E-UTRA:
                    6>  perform the corresponding measurements associated to neighbouring cells on the frequencies
                        indicated in the concerned measObject, as described in 5.5.3.2;
                5>  if the measObject is associated to UTRA-FDD:
                    6>  perform the corresponding measurements associated to neighbouring cells on the frequencies
                        indicated in the concerned measObject, as described in 5.5.3.2;
            4>  if the measRSSI-ReportConfig is configured in the associated reportConfig:
                5>  perform the RSSI and channel occupancy measurements on the frequency indicated in the associated
                    measObject;
[...]
```

********************************** Next Quotation **********************************

5.5.4 Measurement report triggering
5.5.4.1 General
If AS security has been activated successfully, the UE shall:

```
1>  for each measId included in the measIdList within VarMeasConfig:
    2>  if the corresponding reportConfig includes a reportType set to eventTriggered or periodical:
        3>  if the corresponding measObject concerns NR:
            4>  if the corresponding reportConfig includes measRSSI-ReportConfig:
                5>  consider the resource indicated by the rmtc-Config on the associated frequency to be applicable;
            4>  if the eventA1 or eventA2 is configured in the corresponding reportConfig:
                5>  consider only the serving cell to be applicable;
            4>  if the eventA3 or eventA5 is configured in the corresponding reportConfig:
                5>  if a serving cell is associated with a measObjectNR and neighbours are associated with another
                    measObjectNR, consider any serving cell associated with the other measObjectNR to be a
                    neighbouring cell as well;
            4>  if corresponding reportConfig includes reportType set to periodical; or
            4>  for measurement events other than eventA1 or eventA2:
                5>  if useWhiteCellList is set to true:
                    6>  consider any neighbouring cell detected based on parameters in the associated measObjectNR to
                        be applicable when the concerned cell is included in the whiteCellsToAddModList defined within
                        the VarMeasConfig for this measId;
                5>  else:
                    6>  consider any neighbouring cell detected based on parameters in the associated measObjectNR to
                        be applicable when the concerned cell is not included in the blackCellsToAddModList defined
                        within the VarMeasConfig for this measId;
        [...]
    2>  if the reportType is set to eventTriggered and if the entry condition applicable for this event, i.e. the event
        corresponding with the eventId of the corresponding reportConfig within VarMeasConfig, is fulfilled for one
        or more applicable cells for all measurements after layer 3 filtering taken during timeToTrigger defined for this
        event within the VarMeasConfig, while the VarMeasReportList does not include a measurement reporting
        entry for this measId (a first cell triggers the event):
        3>  include a measurement reporting entry within the VarMeasReportList for this measId;
        3>  set the numberOfReportsSent defined within the VarMeasReportList for this measId to 0;
        3>  include the concerned cell(s) in the cellsTriggeredList defined within the VarMeasReportList for this
            measId;
        3>  if useT312 is set to true in reportConfig for this event:
            4>  if T310 for the corresponding SpCell is running; and
            4>  if T312 is not running for corresponding SpCell:
                5>  start timer T312 for the corresponding SpCell with the value of T312 configured in the
                    corresponding measObjectNR;
        3>  initiate the measurement reporting procedure, as specified in 5.5.5;
    2>  else if the reportType is set to eventTriggered and if the entry condition applicable for this event, i.e. the event
        corresponding with the eventId of the corresponding reportConfig within VarMeasConfig, is fulfilled for one
        or more applicable cells not included in the cellsTriggeredList for all measurements after layer 3 filtering taken
        during timeToTrigger defined for this event within the VarMeasConfig (a subsequent cell triggers the event):
        3>  set the numberOfReportsSent defined within the VarMeasReportList for this measId to 0;
        3>  include the concerned cell(s) in the cellsTriggeredList defined within the VarMeasReportList for this
            measId;
        3>  if useT312 is set to true in reportConfig for this event:
            4>  if T310 for the corresponding SpCell is running; and
            4>  if T312 is not running for corresponding SpCell:
                5>  start timer T312 for the corresponding SpCell with the value of T312 configured in the
                    corresponding measObjectNR;
        3>  initiate the measurement reporting procedure, as specified in 5.5.5;
    2>  else if the reportType is set to eventTriggered and if the leaving condition applicable for this event is fulfilled
        for one or more of the cells included in the cellsTriggeredList defined within the VarMeasReportList for this
        measId for all measurements after layer 3 filtering taken during timeToTrigger defined within the
        VarMeasConfig for this event:
```

-continued

3>     remove the concerned cell(s) in the cellsTriggeredList defined within the VarMeasReportList for this measId;
        3>     if reportOnLeave is set to true for the corresponding reporting configuration:
            4>     initiate the measurement reporting procedure, as specified in 5.5.5;
        3>     if the cellsTriggeredList defined within the VarMeasReportList for this measId is empty:
            4>     remove the measurement reporting entry within the VarMeasReportList for this measId;
            4>     stop the periodical reporting timer for this measId, if running;
    2>     else if the reportType is set to eventTriggered and if the entry condition applicable for this event, i.e. the event corresponding with the eventId of the corresponding reportConfig within VarMeasConfig, is fulfilled for one or more applicable transmission resource pools for all measurements taken during timeToTrigger defined for this event within the VarMeasConfig, while the VarMeasReportList does not include an measurement reporting entry for this measId (a first transmission resource pool triggers the event):
        3>     include a measurement reporting entry within the VarMeasReportList for this measId;
        3>     set the numberOfReportsSent defined within the VarMeasReportList for this measId to 0;
        3>     include the concerned transmission resource pool(s) in the poolsTriggeredList defined within the VarMeasReportList for this measId;
        3>     initiate the measurement reporting procedure, as specified in 5.5.5;
    2>     else if the reportType is set to eventTriggered and if the entry condition applicable for this event, i.e. the event corresponding with the eventId of the corresponding reportConfig within VarMeasConfig, is fulfilled for one or more applicable transmission resource pools not included in the poolsTriggeredList for all measurements taken during timeToTrigger defined for this event within the VarMeasConfig (a subsequent transmission resource pool triggers the event):
        3>     set the numberOfReportsSent defined within the VarMeasReportList for this measId to 0;
        3>     include the concerned transmission resource pool(s) in the poolsTriggeredList defined within the VarMeasReportList for this measId;
        3>     initiate the measurement reporting procedure, as specified in 5.5.5;
    2>     else if the reportType is set to eventTriggered and if the leaving condition applicable for this event is fulfilled for one or more applicable transmission resource pools included in the poolsTriggeredList defined within the VarMeasReportList for this measId for all measurements taken during timeToTrigger defined within the VarMeasConfig for this event:
        3>     remove the concerned transmission resource pool(s) in the poolsTriggeredList defined within the VarMeasReportList for this measId;
        3>     if the poolsTriggeredList defined within the VarMeasReportList for this measId is empty:
            4>     remove the measurement reporting entry within the VarMeasReportList for this measId;
            4>     stop the periodical reporting timer for this measId, if running
NOTE 1: Void.
    2>     if reportType is set to periodical and if a (first) measurement result is available:
        3>     include a measurement reporting entry within the VarMeasReportList for this measId;
        3>     set the numberOfReportsSent defined within the VarMeasReportList for this measId to 0;
        3>     if the corresponding reportConfig includes measRSSI-ReportConfig:
            4>     initiate the measurement reporting procedure as specified in 5.5.5 immediately when RSSI sample values are reported by the physical layer after the first L1 measurement duration;
        3>     else if the reportAmount exceeds 1:
            4>     initiate the measurement reporting procedure, as specified in 5.5.5, immediately after the quantity to be reported becomes available for the NR SpCell;
        3>     else (i.e. the reportAmount is equal to 1):
            4>     initiate the measurement reporting procedure, as specified in 5.5.5, immediately after the quantity to be reported becomes available for the NR SpCell and for the strongest cell among the applicable cells;
[...]
    2>     upon expiry of the periodical reporting timer for this measId:
        3>     initiate the measurement reporting procedure, as specified in 5.5.5.
    2>     if the corresponding reportConfig includes a reportType is set to reportSFTD:
        3>     if the corresponding measObject concerns NR:
            4>     if the drx-SFTD-NeighMeas is included:
                5>     if the quantity to be reported becomes available for each requested pair of PCell and NR cell:
                    6>     stop timer T322;
                    6>     initiate the measurement reporting procedure, as specified in 5.5.5;
            4>     else
                5>     initiate the measurement reporting procedure, as specified in 5.5.5, immediately after the quantity to be reported becomes available for each requested pair of PCell and NR cell or the maximal measurement reporting delay as specified in TS 38.133 [14];
        3>     else if the corresponding measObject concerns E-UTRA:
            4>     initiate the measurement reporting procedure, as specified in 5.5.5, immediately after the quantity to be reported becomes available for the pair of PCell and E-UTRA PSCell or the maximal measurement reporting delay as specified in TS 38.133 [14];
[...]
    2>     upon the expiry of T321 for this measId;
        3>     include a measurement reporting entry within the VarMeasReportList for this measId;
        3>     set the numberOfReportsSent defined within the VarMeasReportList for this measId to 0;
        3>     initiate the measurement reporting procedure, as specified in 5.5.5.
    2>     upon the expiry of T322 for this measId;
        3>     initiate the measurement reporting procedure, as specified in 5.5.5.

************************************* Next Quotation *************************************

5.5.5 Measurement reporting

5.5.5.1 General

Figure 5:
FIG. 5 is a reproduction of FIG. 5.5.5.1-1: Measurement reporting, from 3GPP TS 38.331 V16.5.0, "NR, RRC protocol specification".

FIG. 5 is a reproduction of Figure 5.5.5.1-1: Measurement reporting, from 3GFF TS 38.331 V16.5.0, "NR, RRC protocol specification."

The purpose of this procedure is to transfer measurement results from the UE to the network. The UE shall initiate this procedure only after successful AS security activation. For the measId for which the measurement reporting procedure was triggered, the UE shall set the measResults within the MeasurementReport message as follows:

```
1>   set the measId to the measurement identity that triggered the measurement reporting;
1>   for each serving cell configured with servingCellMO:
       2>   if the reportConfig associated with the measId that triggered the measurement reporting includes rsType:
              3>   if the serving cell measurements based on the rsType included in the reportConfig that triggered the
                   measurement report are available:
                     4>   set the measResultServingCell within measResultServingMOList to include RSRP, RSRQ and the
                          available SINR of the serving cell, derived based on the rsType included in the reportConfig that
                          triggered the measurement report;
       2>   else:
              3>   if SSB based serving cell measurements are available:
                     4>   set the measResultServingCell within measResultServingMOList to include RSRP, RSRQ and the
                          available SINR of the serving cell, derived based on SSB;
              3>   else if CSI-RS based serving cell measurements are available:
                     4>   set the measResultServingCell within measResultServingMOList to include RSRP, RSRQ and the
                          available SINR of the serving cell, derived based on CSI-RS;
1>   set the servCellId within measResultServingMOList to include each NR serving cell that is configured with
     servingCellMO, if any;
1>   if the reportConfig associated with the measId that triggered the measurement reporting includes
     report QuantityRS-Indexes and maxNrofRS-IndexesToReport:
       2>   for each serving cell configured with servingCellMO, include beam measurement information according to the
            associated reportConfig as described in 5.5.5.2;
1>   if the reportConfig associated with the measId that triggered the measurement reporting includes
     reportAddNeighMeas:
       2>   for each measObjectId referenced in the measIdList which is also referenced with servingCellMO, other than
            the measObjectId corresponding with the measId that triggered the measurement reporting:
              3>   if the measObjectNR indicated by the servingCellMO includes the RS resource configuration corresponding
                   to the rsType indicated in the reportConfig:
                     4>   set the measResultBestNeighCell within measResultServingMOList to include the physCellId and the
                          available measurement quantities based on the reportQuantityCell and rsType indicated in reportConfig
                          of the non-serving cell corresponding to the concerned measObjectNR with the highest measured RSRP
                          if RSRP measurement results are available for cells corresponding to this measObjectNR, otherwise
                          with the highest measured RSRQ if RSRQ measurement results are available for cells corresponding to
                          this measObjectNR, otherwise with the highest measured SINR;
                     4>   if the reportConfig associated with the measId that triggered the measurement reporting includes
                          reportQuantityRS-Indexes and maxNrofRS-IndexesToReport:
                            5>   for each best non-serving cell included in the measurement report:
                                   6>   include beam measurement information according to the associated reportConfig as described in
                                        5.5.5.2;
1>   if the reportConfig associated with the measId that triggered the measurement reporting is set to eventTriggered
     and eventID is set to eventA3, or eventA4, or eventA5, or eventB1, or eventB2:
       2>   if the UE is in NE-DC and the measurement configuration that triggered this measurement report is associated
            with the MCG:
              3>   set the measResultServFreqListEUTRA-SCG to include an entry for each E-UTRA SCG serving frequency
                   with the following:
                     4>   include carrierFreq of the E-UTRA serving frequency;
                     4>   set the measResultServingCell to include the available measurement quantities that the UE is configured
                          to measure by the measurement configuration associated with the SCG;
                     4>   if reportConfig associated with the measId that triggered the measurement reporting includes
                          reportAddNeighMeas:
                            5>   set the measResultServFreqListEUTRA-SCG to include within measResultBestNeighCell the
                                 quantities of the best non-serving cell, based on RSRP, on the concerned serving frequency;
1>   if reportConfig associated with the measId that triggered the measurement reporting is set to eventTriggered and
     eventID is set to eventA3, or eventA4, or eventA5:
       2>   if the UE is in NR-DC and the measurement configuration that triggered this measurement report is associated
            with the MCG:
              3>   set the measResultServFreqListNR-SCG to include for each NR SCG serving cell that is configured with
                   servingCellMO, if any, the following:
                     4>   if the reportConfig associated with the measId that triggered the measurement reporting includes
                          rsType:
                            5>   if the serving cell measurements based on the rsType included in the reportConfig that triggered the
                                 measurement report are available according to the measurement configuration associated with the
                                 SCG:
                                   6>   set the measResultServingCell within measResultServFreqListNR-SCG to include RSRP, RSRQ
                                        and the available SINR of the serving cell, derived based on the rsType included in the
                                        reportConfig that triggered the measurement report;
                     4>   else:
                            5>   if SSB based serving cell measurements are available according to the measurement configuration
                                 associated with the SCG:
                                   6>   set the measResultServingCell within measResultServFreqListNR-SCG to include RSRP, RSRQ
                                        and the available SINR of the serving cell, derived based on SSB;
```

```
        5>  else if CSI-RS based serving cell measurements are available according to the measurement
            configuration associated with the SCG:
            6>  set the measResultServingCell within measResultServFreqListNR-SCG to include RSRP, RSRQ
                and the available SINR of the serving cell, derived based on CSI-RS;
    4>  if results for the serving cell derived based on SSB are included:
        5>  include the ssbFrequency to the value indicated by ssbFrequency as included in the MeasObjectNR
            of the serving cell;
    4>  if results for the serving cell derived based on CSI-RS are included:
        5>  include the refFreqCSI-RS to the value indicated by refFreqCSI-RS as included in the
            MeasObjectNR of the serving cell;
    4>  if the reportConfig associated with the measId that triggered the measurement reporting includes
        reportQuantityRS-Indexes and maxNrofRS-IndexesToReport:
        5>  for each serving cell configured with servingCellMO, include beam measurement information
            according to the associated reportConfig as described in 5.5.5.2, where availability is considered
            according to the measurement configuration associated with the SCG;
    4>  if reportConfig associated with the measId that triggered the measurement reporting includes
        reportAddNeighMeas:
        5>  if the measObjectNR indicated by the servingCellMO includes the RS resource configuration
            corresponding to the rsType indicated in the reportConfig:
            6>  set the measResultBestNeighCellListNR within measResultServFreqListNR-SCG to include one
                entry with the physCellId and the available measurement quantities based on the
                reportQuantityCell and rsType indicated in reportConfig of the non-serving cell corresponding
                to the concerned measObjectNR with the highest measured RSRP if RSRP measurement results
                are available for cells corresponding to this measObjectNR, otherwise with the highest measured
                RSRQ if RSRQ measurement results are available for cells corresponding to this measObjectNR,
                otherwise with the highest measured SINR, where availability is considered according to the
                measurement configuration associated with the SCG;
                7>  if the reportConfig associated with the measId that triggered the measurement reporting
                    includes reportQuantityRS-Indexes and maxNrofRS-IndexesToReport:
                    8>  for each best non-serving cell included in the measurement report:
                        9>  include beam measurement information according to the associated reportConfig as
                            described in 5.5.5.2, where availability is considered according to the measurement
                            configuration associated with the SCG;
1>  if the measRSSI-ReportConfig is configured within the corresponding reportConfig for this measId:
    2>  set the rssi-Result to the linear average of sample value(s) provided by lower layers in the reportInterval;
    2>  set the channelOccupancy to the rounded percentage of sample values which are beyond the
        channelOccupancyThreshold within all the sample values in the reportInterval;
1>  if there is at least one applicable neighbouring cell to report:
    2>  if the reportType is set to eventTriggered or periodical:
        3>  set the measResultNeighCells to include the best neighbouring cells up to maxReportCells in accordance
            with the following:
            4>  if the reportType is set to eventTriggered:
                5>  include the cells included in the cellsTriggeredList as defined within the VarMeasReportList for this
                    measId;
            4>  else:
                5>  include the applicable cells for which the new measurement results became available since the last
                    periodical reporting or since the measurement was initiated or reset;
            4>  for each cell that is included in the measResultNeighCells, include the physCellId;
            4>  if the reportType is set to eventTriggered or periodical:
                5>  for each included cell, include the layer 3 filtered measured results in accordance with the
                    reportConfig for this measId, ordered as follows:
                    6>  if the measObject associated with this measId concerns NR:
                        7>  if rsType in the associated reportConfig is set to ssb:
                            8>  set resultsSSB-Cell within the measResult to include the SS/PBCH block based
                                quantity(ies) indicated in the reportQuantityCell within the concerned reportConfig, in
                                decreasing order of the sorting quantity, determined as specified in 5.5.5.3, i.e. the best
                                cell is included first;
                            8>  if reportQuantityRS-Indexes and maxNrofRS-IndexesToReport are configured, include
                                beam measurement information as described in 5.5.5.2;
                        7>  else if rsType in the associated reportConfig is set to csi-rs:
                            8>  set resultsCSI-RS-Cell within the measResult to include the CSI-RS based quantity(ies)
                                indicated in the reportQuantityCell within the concerned reportConfig, in decreasing
                                order of the sorting quantity, determined as specified in 5.5.5.3, i.e. the best cell is
                                included first;
                            8>  if reportQuantityRS-Indexes and maxNrofRS-IndexesToReport are configured, include
                                beam measurement information as described in 5.5.5.2;
                    6>  if the measObject associated with this measId concerns E-UTRA:
                        7>  set the measResult to include the quantity(ies) indicated in the reportQuantity within the
                            concerned reportConfigInterRAT in decreasing order of the sorting quantity, determined as
                            specified in 5.5.5.3, i.e. the best cell is included first;
                    6>  if the measObject associated with this measId concerns UTRA-FDD and if
                        ReportConfigInterRAT includes the reportQuantityUTRA-FDD:
                        7>  set the measResult to include the quantity(ies) indicated in the reportQuantityUTRA-FDD
                            within the concerned reportConfigInterRAT in decreasing order of the sorting quantity,
                            determined as specified in 5.5.5.3, i.e. the best cell is included first;
[...]
```

1> if the corresponding measObject concerns NR:
    2> if the reportSFTD-Meas is set to true within the corresponding reportConfigNR for this measId:
        3> set the measResultSFTD-NR in accordance with the following:
            4> set sfn-OffsetResult and frameBoundaryOffsetResult to the measurement results provided by lower layers;
            4> if the reportRSRP is set to true;
                5> set rsrp-Result to the RSRP of the NR PSCell derived based on SSB;
    2> else if the reportSFTD-NeighMeas is included within the corresponding reportConfigNR for this measId:
        3> for each applicable cell which measurement results are available, include an entry in the measResultCellListSFTD-NR and set the contents as follows:
            4> set physCellId to the physical cell identity of the concered NR neighbour cell.
            4> set sfn-OffsetResult and frameBoundaryOffsetResult to the measurement results provided by lower layers;
            4> if the reportRSRP is set to true:
                5> set rsrp-Result to the RSRP of the concerned cell derived based on SSB;
1> else if the corresponding measObject concerns E-UTRA:
    2> if the reportSFTD-Meas is set to true within the corresponding reportConfigInterRAT for this measId:
        3> set the measResultSFTD-EUTRA in accordance with the following:
            4> set sfn-OffsetResult and frameBoundaryOffsetResult to the measurement results provided by lower layers;
            4> if the reportRSRP is set to true;
                5> set rsrpResult-EUTRA to the RSRP of the EUTRA PSCell;
1> if avareage uplink PDCP delay values are available:
    2> set the ul-PDCP-DelayValueResultList to include the corresponding average uplink PDCP delay values;
1> if the includeCommonLocationInfo is configured in the corresponding reportConfig for this measId and detailed location information that has not been reported is available, set the content of commonLocationInfo of the locationInfo as follows:
    2> include the locationTimestamp;
    2> include the locationCoordinate, if available;
    2> include the velocityEstimate, if available;
    2> include the locationError, if available;
    2> include the locationSource, if available;
    2> if available, include the gnss-TOD-msec,
[...]
1> increment the numberOfReportsSent as defined within the VarMeasReportList for this measId by 1;
1> stop the periodical reporting timer, if running;
1> if the numberOfReportsSent as defined within the VarMeasReportList for this measId is less than the reportAmount as defined within the corresponding reportConfig for this measId:
    2> start the periodical reporting timer with the value of reportInterval as defined within the corresponding reportConfig for this measId;
[...]
1> else if the UE is in (NG)EN-DC:
    2> if SRB3 is configured:
        3> submit the MeasurementReport message via SRB3 to lower layers for transmission, upon which the procedure ends;
    2> else:
        3> submit the MeasurementReport message via E-UTRA embedded in E-UTRA RRC message ULInformationTransferMRDC as specified in TS 36.331 [10].
1> else if the UE is in NR-DC:
    2> if the measurement configuration that triggered this measurement report is associated with the SCG:
        3> if SRB3 is configured:
            4> submit the MeasurementReport message via SRB3 to lower layers for transmission, upon which the procedure ends;
        3> else:
            4> submit the MeasurementReport message via SRB1 embedded in NR RRC message ULInformationTransferMRDC as specified in 5.7.2a.3;
    2> else:
        3> submit the MeasurementReport message via SRB1 to lower layers for transmission, upon which the procedure ends;
1> else:
    2> submit the MeasurementReport message to lower layers for transmission, upon which the procedure ends.

5.5.5.2 Reporting of beam measurement information
For beam measurement information to be included in a measurement report the UE shall:

1> if reportType is set to eventTriggered:
    2> consider the trigger quantity as the sorting quantity if available, otherwise RSRP as sorting quantity if available, otherwise RSRQ as sorting quantity if available, otherwise SINR as sorting quantity;
1> if reportType is set to periodical:
    2> if a single reporting quantity is set to true in reportQuantityRS-Indexes;
        3> consider the configured single quantity as the sorting quantity;
    2> else:
        3> if rsrp is set to true;
            4> consider RSRP as the sorting quantity;

```
            3>  else:
                4>  consider RSRQ as the sorting quantity;
    1>  set rsIndexResults to include up to maxNrofRS-IndexesToReport SS/PBCH block indexes or CSI-RS indexes in
        order of decreasing sorting quantity as follows:
        2>  if the measurement information to be included is based on SS/PBCH block:
            3>  include within resultsSSB-Indexes the index associated to the best beam for that SS/PBCH block sorting
                quantity and if absThreshSS-BlocksConsolidation is included in the VarMeasConfig for the measObject
                associated to the cell for which beams are to be reported, the remaining beams whose sorting quantity is
                above absThreshSS-BlocksConsolidation;
            3>  if includeBeamMeasurements is configured, include the SS/PBCH based measurement results for the
                quantities in reportQuantityRS-Indexes set to true for each SS/PBCH block index;
        2>  else if the beam measurement information to be included is based on CSI-RS:
            3>  include within resultsCSI-RS-Indexes the index associated to the best beam for that CSI-RS sorting quantity
                and, if absThreshCSI-RS-Consolidation is included in the VarMeasConfig for the measObject associated to
                the cell for which beams are to be reported, the remaining beams whose sorting quantity is above
                absThreshCSI-RS-Consolidation;
            3>  if includeBeamMeasurements is configured, include the CSI-RS based measurement results for the
                quantities in reportQuantityRS-Indexes set to true for each CSI-RS index.
```

\*\*\*\*\*\*\*\*\*\*\*\*\*\*\*\*\*\*\*\*\*\*\*\*\*\*\*\*\*\*\*\*\*\*\*\*\*\*\*\* Next Quotation \*\*\*\*\*\*\*\*\*\*\*\*\*\*\*\*\*\*\*\*\*\*\*\*\*\*\*\*\*\*\*\*\*\*\*\*\*\*\*\*

- CommonLocationInfo

The IE CommonLocationInfo is used to transfer detailed location information available at the UE to correlate measurements and UE position information.

CommonLocationInfo information element

```
CommonLocationInfo-r16 ::=      SEQUENCE {
    gnss-TOD-msec-r16           OCTET STRING            OPTIONAL,
    locationTimestamp-r16       OCTET STRING            OPTIONAL,
    locationCoordinate-r16      OCTET STRING            OPTIONAL,
    locationError-r16           OCTET STRING            OPTIONAL,
    locationSource-r16          OCTET STRING            OPTIONAL,
    velocityEstimate-r16        OCTET STRING            OPTIONAL
}
```

CommonLocationInfo field descriptions
gnss-TOD-msec
Parameter type gnss-TOD-msec defined in TS 37.355 [49]. The first/leftmost bit of the first octet contains the most significant bit.
locationTimeStamp
Parameter type DisplacementTimeStamp defined in TS 37.355 [49]. The first/leftmost bit of the first octet contains the most significant bit.
locationCoordinate
Parameter type LocationCoordinates defined in TS 37.355 [49]. The first/leftmost bit of the first octet contains the most significant bit.
locationError
Parameter LocationError defined in TS 37.355 [49]. The first/leftmost bit of the first octet contains the most significant bit.
locationSource
Parameter LocationSource defined in TS 37.355 [49]. The first/leftmost bit of the first octet contains the most significant bit.
velocityEstimate
Parameter type Velocity defined in TS 37.355 [49]. The first/leftmost bit of the first octet contains the most significant bit.

\*\*\*\*\*\*\*\*\*\*\*\*\*\*\*\*\*\*\*\*\*\*\*\*\*\*\*\*\*\*\*\*\*\*\*\*\*\*\*\* Next Quotation \*\*\*\*\*\*\*\*\*\*\*\*\*\*\*\*\*\*\*\*\*\*\*\*\*\*\*\*\*\*\*\*\*\*\*\*\*\*\*\*

- LocationInfo

The IE LocationInfo is used to transfer available detailed location information, Bluetooth, WLAN and sensor available measurement results at the UE.

LocationInfo information element

```
LocationInfo-r16 ::=            SEQUENCE {
    commonLocationInfo-r16      CommonLocationInfo-r16          OPTIONAL,
    bt-LocationInfo-r16         LogMeasResultListBT-r16         OPTIONAL,
    wlan-LocationInfo-r16       LogMeasResultListWLAN-r16       OPTIONAL,
    sensor-LocationInfo-r16     Sensor-LocationInfo-r16         OPTIONAL,
    ...
}
```

\*\*\*\*\*\*\*\*\*\*\*\*\*\*\*\*\*\*\*\*\*\*\*\*\*\*\*\*\*\*\*\*\*\*\*\*\*\*\*\* Next Quotation \*\*\*\*\*\*\*\*\*\*\*\*\*\*\*\*\*\*\*\*\*\*\*\*\*\*\*\*\*\*\*\*\*\*\*\*\*\*\*\*

- MeasConfig

The IE MeasConfig specifies measurements to be performed by the UE, and covers intra-frequency, inter-frequency and inter-RAT mobility as well as configuration of measurement gaps.

MeasConfig information element

```
MeasConfig ::=                          SEQUENCE {
    measObjectToRemoveList              MeasObjectToRemoveList
OPTIONAL,           -- Need N
    measObjectToAddModList              MeasObjectToAddModList
OPTIONAL,           -- Need N
    reportConfigToRemoveList            ReportConfigToRemoveList
OPTIONAL,           -- Need N
    reportConfigToAddModList            ReportConfigToAddModList
OPTIONAL,           -- Need N
    measIdToRemoveList                  MeasIdToRemoveList
```

```
OPTIONAL,           -- Need N
    measIdToAddModList                      MeasIdToAddModList
OPTIONAL,           -- Need N
    s-MeasureConfig                         CHOICE {
        ssb-RSRP                                RSRP-Range,
        csi-RSRP                                RSRP-Range
    }
OPTIONAL,           --Need M
    quantityConfig                          QuantityConfig
OPTIONAL,           -- Need M
    measGapConfig                           MeasGapConfig
OPTIONAL,           -- Need M
    measGapSharingConfig                    MeasGapSharingConfig
OPTIONAL,           -- Need M
    ...,
    interFrequencyConfig-NoGap-r16          ENUMERATED {true}
OPTIONAL            -- Need R
}
MeasObjectToRemoveList ::=                  SEQUENCE (SIZE (1..maxNrofObjectId)) OF MeasObjectId
MeasIdToRemoveList ::=                      SEQUENCE (SIZE (1..maxNrofMeasId)) OF MeasId
ReportConfigToRemoveList ::=                SEQUENCE (SIZE (1..maxReportConfigId)) OF ReportConfigId
                                            MeasConfig field descriptions
``` interFrequencyConfig-NoGap-r16
If the field is set to true, UE is configured to perform SSB based inter-frequency measurement without measurement gaps when the inter-frequency SSB is completely contained in the active DL BWP of the UE, as specified in TS 38.133 [14], clause 9.3. Otherwise, the SSB based inter-frequency measurement is performed within measurement gaps.
measGapConfig
Used to setup and release measurement gaps in NR.
measIdToAddModList
List of measurement identities to add and/or modify.
measIdToRemoveList
List of measurement identities to remove.
measObjectToAddModList
List of measurement objects to add and/or modify.
measObjectToRemoveList
List of measurement objects to remove.
reportConfigToAddModList
List of measurement reporting configurations to add and/or modify.
reportConfigToRemoveList
List of measurement reporting configurations to remove.
s-MeasureConfig
Threshold for NR SpCell RSRP measurement controlling when the UE is required to perform measurements on non-serving cells. Choice of ssb-RSRP corresponds to cell RSRP based on SS/PBCH block and choice of csi-RSRP corresponds to cell RSRP of CSI-RS.

**************************************** Next Quotation ****************************************
- MeasId
The IE MeasId is used to identify a measurement configuration, i.e., linking of a measurement object and a reporting configuration.

MeasId information element

```
MeasId ::=                                  INTEGER (1..maxNrofMeasId)
```
**************************************** Next Quotation ****************************************
- MeasResults
The IE MeasResults covers measured results for intra-frequency, inter-frequency, inter-RAT mobility and measured results for sidelink.

MeasResults information element

```
MeasResults ::=                             SEQUENCE {
    measId                                      MeasId,
    measResultServingMOList                     MeasResultServMOList,
    measResultNeighCells                        CHOICE {
        measResultListNR                            MeasResultListNR,
        ...,
        measResultListEUTRA                         measResultListEUTRA,
        measResultListUTRA-FDD-r16                  MeasResultListUTRA-FDD-r16
    }
OPTIONAL,
    ...,
    [[
    measResultServFreqListEUTRA-SCG             MeasResultServFreqListEUTRA-SCG
OPTIONAL,
    measResultServFreqListNR-SCG                MeasResultServFreqListNR-SCG
OPTIONAL,
    measResultSFTD-EUTRA                        MeasResultSFTD-EUTRA
```

```
                                    -continued

OPTIONAL,
        measResultSFTD-NR                       MeasResultCellSFTD-NR
OPTIONAL
        ]],
        measResultCellListSFTD-NR               MeasResultCellListSFTD-NR
OPTIONAL,
        measResultForRSSI-r16                   MeasResultForRSSI-r16
OPTIONAL,
        locationInfo-r16                        LocationInfo-r16
OPTIONAL,
        ul-PDCP-DelayValueResultList-r16        UL-PDCP-DelayValueResultList-r16
OPTIONAL,
        measResultsSL-r16                       MeasResultsSL-r16
OPTIONAL,
        measResultCLI-r16                       MeasResultCLI-r16
OPTIONAL
}
MeasResultServMOList ::=                   SEQUENCE (SIZE (1..maxNrofServingCells)) OF MeasResultServMO
MeasResultServMO ::=                       SEQUENCE {
        servCellId                              ServCellIndex,
        measResult ServingCell                  MeasResultNR,
        measResultBestNeighCell                 MeasResultNR
OPTIONAL,
        ...
}
MeasResultListNR ::=                       SEQUENCE (SIZE (1..maxCellReport)) OF MeasResultNR
MeasResultNR ::=                           SEQUENCE {
        physCellId                              PhysCellId
OPTIONAL,
        measResult                              SEQUENCE {
            cellResults                             SEQUENCE{
                resultsSSB-Cell                         MeasQuantityResults
OPTIONAL,
                resultsCSI-RS-Cell                      MeasQuantityResults
OPTIONAL
            },
            rsIndexResults                          SEQUENCE{
                resultsSSB-Indexes                      ResultsPerSSB-IndexList
OPTIONAL,
                resultsCSI-RS-Indexes                   ResultsPerCSI-RS-IndexList
OPTIONAL
            }
OPTIONAL
        },
        ...,
        cgi-Info                                CGI-InfoNR
OPTIONAL
}
MeasResultListEUTRA ::=                    SEQUENCE (SIZE (1..maxCellReport)) OF MeasResultEUTRA
MeasResultEUTRA ::=                        SEQUENCE {
        eutra-PhysCellId                        PhysCellId,
        measResult                              MeasQuantityResultsEUTRA,
        cgi-Info                                CGI-InfoEUTRA
OPTIONAL,
        ...
}
MultiBandInfoListEUTRA ::=                 SEQUENCE (SIZE (1..maxMultiBands)) OF FreqBandIndicatorEUTRA
MeasQuantityResults ::=                    SEQUENCE {
        rsrp                                    RSRP-Range
OPTIONAL,
        rsrq                                    RSRQ-Range
OPTIONAL,
        sinr                                    SINR-Range
OPTIONAL
}
MeasQuantityResultsEUTRA ::=               SEQUENCE {
        rsrp                                    RSRP-RangeEUTRA
OPTIONAL,
        rsrq                                    RSRQ-RangeEUTRA
OPTIONAL,
        sinr                                    SINR-RangeEUTRA
OPTIONAL
}
ResultsPerSSB-IndexList::=                 SEQUENCE (SIZE (1..maxNrofIndexesToReport2)) OF
ResultsPerSSB-Index
ResultsPerSSB-Index ::=                    SEQUENCE {
        ssb-Index                               SSB-Index,
        ssb-Results                             MeasQuantityResults
```

```
                           -continued

OPTIONAL
}
ResultsPerCSI-RS-IndexList::=          SEQUENCE (SIZE (1..maxNrofIndexesToReport2)) OF
ResultsPerCSI-RS-Index
ResultsPerCSI-RS-Index ::=             SEQUENCE {
    csi-RS-Index                           CSI-RS-Index,
    csi-RS-Results                         MeasQuantityResults
OPTIONAL
}
MeasResultServFreqListEUTRA-SCG ::=    SEQUENCE (SIZE (1..maxNrofServingCellsEUTRA)) OF MeasResult2EUTRA
MeasResultServFreqListNR-SCG ::=       SEQUENCE (SIZE (1..maxNrofServingCells)) OF MeasResult2NR
MeasResultListUTRA-FDD-r16 ::=         SEQUENCE (SIZE (1..maxCellReport)) OF MeasResultUTRA-FDD-r16
MeasResultUTRA-FDD-r16 ::=             SEQUENCE {
    physCellId-r16                         PhysCellIdUTRA-FDD-r16,
    measResult-r16                         SEQUENCE {
        utra-FDD-RSCP-r16                      INTEGER (-5..91)          OPTIONAL,
        utra-FDD-EcN0-r16                      INTEGER (0..49)           OPTIONAL
    }
}
MeasResultForRSSI-r16 ::=              SEQUENCE {
    rssi-Result-r16                        RSSI-Range-r16,
    channelOccupancy-r16                   INTEGER (0..100)
}
MeasResultCLI-r16 ::=                  SEQUENCE {
    measResultListSRS-RSRP-r16             MeasResultListSRS-RSRP-r16
OPTIONAL,
    measResultListCLI-RSSI-r16             MeasResultListCLI-RSSI-r16
OPTIONAL
}
MeasResultListSRS-RSRP-r16 ::=         SEQUENCE (SIZE (1.. maxCLI-Report-r16)) OF MeasResultSRS-RSRP-r16
MeasResultSRS-RSRP-r16 ::=             SEQUENCE {
    srs-ResourceId-r16                     SRS-ResourceId,
    srs-RSRP-Result-r16                    SRS-RSRP-Range-r16
}
[...]
```

MeasResultNR field descriptions cellResults
Cell level measurement results.
locationInfo
Positioning related information and measurements.
physCellId
The physical cell identity of the NR cell for which the reporting is being performed.
resultsSSB-Cell
Cell level measurement results based on SS/PBCH related measurements.
resultsSSB-Indexes
Beam level measurement results based on SS/PBCH related measurements.
resultsCSI-RS-Cell
Cell level measurement results based on CSI-RS related measurements.
resultsCSI-RS-Indexes
Beam level measurement results based on CSI-RS related measurements.
rsIndexResults
Beam level measurement results.
[...]

MeasResults field descriptions measId
Identifies the measurement identity for which the reporting is being performed.
measQuantityResults
The value sinr is not included when it is used for LogMeasReport-r16.
measResultCellListSFTD-NR
SFTD measurement results between the PCell and the NR neighbour cell(s) in NR standalone.
measResultCLI
CLI measurement results.
measResultEUTRA
Measured results of an E-UTRA cell.
measResultForRSSI
Includes measured RSSI result in dBm (see TS 38.215 [9]) and channelOccupancy which is the percentage of samples
when the RSSI was above the configured channelOccupancyThreshold for the associated reportConfig.
measResultListEUTRA
List of measured results for the maximum number of reported best cells for an E-UTRA measurement identity.
measResultListNR List of measured results for the maximum number of reported best cells for an NR measurement identity.
measResultListUTRA-FDD
List of measured results for the maximum number of reported best cells for a UTRA-FDD measurement identity.
measResultNR
Measured results of an NR cell.
measResultServFreqListEUTRA-SCG
Measured results of the E-UTRA SCG serving frequencies: the measurement result of PSCell and each SCell, if any, and of the best neighbouring cell on each E-UTRA SCG serving frequency.
measResultServFreqListNR-SCG
Measured results of the NR SCG serving frequencies: the measurement result of PSCell and each SCell, if any, and of the best neighbouring cell on each NR SCG serving frequency.
measResultServingMOList
Measured results of measured cells with reference signals indicated in the serving cell measurement objects including measurement results of SpCell, configured SCell(s) and best neighbouring cell within measured cells with reference signals indicated in on each serving cell measurement object. If the sending of the MeasurementReport message is triggered by a measurement configured by the field sl-ConfigDedicatedForNR received within an E-UTRA RRCConnectionReconfiguration message (i.e. CBR measurements), this field is not applicable and its contents is ignored by the network.

**************************** Next Quotation ****************************

ReportConfigNR

The IE ReportConfigNR specifics criteria for triggering of an NR measurement reporting event or of a CHO or CPC event. For events labelled AN with N equal to 1, 2 and so on, measurement reporting events and CHO or CPC events are based on cell measurement results, which can either be derived based on SS/PBCH block or CSI-RS.

Event A1: Serving becomes better than absolute threshold;

Event A2: Serving becomes worse than absolute threshold;

Event A3: Neighbour becomes amount of offset better than PCell/PSCell;

Event A4: Neighbour becomes better than absolute threshold;

Event A5: PCell/PSCell becomes worse than absolute threshold1 AND Neighbour/SCell becomes better than another absolute threshold2;

Event A6: Neighbour becomes amount of offset better than SCell;

CondEvent A3: Conditional reconfiguration candidate becomes amount of offset better than PCell/PSCell;

CondEvent A5: PCell/PSCell becomes worse than absolute threshold1 AND Conditional reconfiguration candidate becomes better than another absolute threshold2;

For event I1, measurement reporting event is based on CLI measurement results, which can either be derived based on SRS-RSRP or CLI-RSSI.

Event I1: Interference becomes higher than absolute threshold.

ReportConfigNR information element

```
ReportConfigNR ::=                    SEQUENCE {
    reportType                            CHOICE {
        periodical                            PeriodicalReportConfig,
        eventTriggered                        EventTriggerConfig,
        ...,
        reportedCGI                           ReportCGI,
        reportSFTD                            ReportSFTD-NR,
        condTriggerConfig-r16                 CondTriggerConfig-r16,
        cli-Periodical-r16                    CLI-PeriodicalReportConfig-r16
        cli-EventTriggered-r16                CLI-EventTriggerConfig-r16
    }
}
[...]
CondTriggerConfig-r16 ::=             SEQUENCE {
    condEventId                           CHOICE {
        condEventA3                           SEQUENCE {
            a3-Offset                             MeasTriggerQuantityOffset,
            hysteresis                            Hysteresis,
            timeToTrigger                         TimeToTrigger
        },
        condEventA5                           SEQUENCE {
            a5-Threshold1                         MeasTriggerQuantity,
            a5-Threshold2                         MeasTriggerQuantity,
            hysteresis                            Hysteresis,
            timeToTrigger                         TimeToTrigger
        },
        ...
    },
    rsType-r16                            NR-RS-Type,
    ...
}
EventTriggerConfig::=                 SEQUENCE {
    eventId                               CHOICE {
        eventA1                               SEQUENCE {
            a1-Threshold                          MeasTriggerQuantity,
```

```
                reportOnLeave                       BOOLEAN,
                hysteresis                          Hysteresis,
                timeToTrigger                       TimeToTrigger
            },
            eventA2                                 SEQUENCE {
                a2-Threshold                            MeasTriggerQuantity,
                reportOnLeave                           BOOLEAN,
                hysteresis                              Hysteresis,
                timeToTrigger                           TimeToTrigger
            },
            eventA3                                 SEQUENCE {
                a3-Offset                               MeasTriggerQuantityOffset,
                reportOnLeave                           BOOLEAN,
                hysteresis                              Hysteresis,
                timeToTrigger                           TimeToTrigger,
                useWhiteCellList                        BOOLEAN
            },
            eventA4                                 SEQUENCE {
                a4-Threshold                            MeasTriggerQuantity,
                reportOnLeave                           BOOLEAN,
                hysteresis                              Hysteresis,
                timeToTrigger                           TimeToTrigger,
                useWhiteCellList                        BOOLEAN
            },
            eventA5                                 SEQUENCE {
                a5-Threshold1                           MeasTriggerQuantity,
                a5-Threshold2                           MeasTriggerQuantity,
                reportOnLeave                           BOOLEAN,
                hysteresis                              Hysteresis,
                timeToTrigger                           TimeToTrigger,
                useWhiteCellList                        BOOLEAN
            },
            eventA6                                 SEQUENCE {
                a6-Offset                               MeasTriggerQuantityOffset,
                reportOnLeave                           BOOLEAN,
                hysteresis                              Hysteresis,
                timeToTrigger                           TimeToTrigger,
                useWhiteCellList                        BOOLEAN
            },
            ...
        },
        rsType                                  NR-RS-Type,
        reportInterval                          ReportInterval,
        reportAmount                            ENUMERATED {r1, r2, r4, r8, r16, r32, r64, infinity},
        reportQuantityCell                      MeasReportQuantity,
        maxReportCells                          INTEGER (1..maxCellReport),
        reportQuantityRS-Indexes                    MeasReportQuantity
OPTIONAL,                   -- Need R
        maxNrofRS-IndexesToReport               INTEGER (1..maxNrofIndexesToReport)
OPTIONAL,                   -- Need R
        includeBeamMeasurements                 BOOLEAN,
        reportAddNeighMeas                      ENUMERATED {setup}
OPTIONAL,                   -- Need R
        ...,
        measRSSI-ReportConfig-r16               MeasRSSI-ReportConfig-r16
OPTIONAL,                   -- Need R
        useT312-r16                             BOOLEAN
OPTIONAL,                   -- Need M
        includeCommonLocationInfo-r16           ENUMERATED {true}
OPTIONAL,                   -- Need R
        includeBT-Meas-r16                      SetupRelease {BT-NameList-r16}
OPTIONAL,                   -- Need M
        includeWLAN-Meas-r16                    SetupRelease {WLAN-NameList-r16}
OPTIONAL,                   -- Need M
        includeSensor-Meas-r16                  SetupRelease {Sensor-NameList-r16}
OPTIONAL                    -- Need M
}
PeriodicalReportConfig ::=                  SEQUENCE {
        rsType                                  NR-RS-Type,
        reportInterval                          ReportInterval,
        reportAmount                            ENUMERATED {r1, r2, r4, r8, r16, r32, r64, infinity},
        reportQuantityCell                      MeasReportQuantity,
        maxReportCells                          INTEGER (1..maxCellReport),
        reportQuantityRS-Indexes                MeasReportQuantity
```

```
OPTIONAL,             -- Need R
    maxNrofRS-IndexesToReport              INTEGER (1..maxNrofIndexesToReport)
OPTIONAL,             -- Need R
    includeBeamMeasurements                BOOLEAN,
    useWhiteCellList                       BOOLEAN,
    ...,
    measRSSI-ReportConfig-r16              MeasRSSI-ReportConfig-r16
OPTIONAL,             -- Need R
    includeCommonLocationInfo-r16          ENUMERATED {true}
OPTIONAL,             -- Need R
    includeBT-Meas-r16                     SetupRelease {BT-NameList-r16}
OPTIONAL,             -- Need M
    includeWLAN-Meas-r16                   SetupRelease {WLAN-NameList-r16}
OPTIONAL,             -- Need M
    includeSensor-Meas-r16                 SetupRelease {Sensor-NameList-r16}
OPTIONAL,             -- Need M
    ul-DelayValueConfig-r16                SetupRelease { UL-DelayValueConfig-r16 }
OPTIONAL,             -- Need M
    reportAddNeighMeas-r16                 ENUMERATED {setup}
OPTIONAL              -- Need R
}
NR-RS-Type ::=                             ENUMERATED {ssb, csi-rs}
MeasTriggerQuantity ::=                    CHOICE {
    rsrp                                       RSRP-Range,
    rsrq                                       RSRQ-Range,
    sinr                                       SINR-Range
}
MeasTriggerQuantityOffset ::=              CHOICE {
    rsrp                                       INTEGER (-30..30),
    rsrq                                       INTEGER (-30..30),
    sinr                                       INTEGER (-30..30)
}
MeasReportQuantity ::=                     SEQUENCE {
    rsrp                                       BOOLEAN,
    rsrq                                       BOOLEAN,
    sinr                                       BOOLEAN
}
MeasRSSI-ReportConfig-r16 ::=              SEQUENCE {
    channelOccupancyThreshold-r16              RSSI-Range-r16              OPTIONAL   -- Need R
}
[...]
```

ReportConfigNR field descriptions reportType
Type of the configured measurement report. In MR-DC, network does not configure report of type reportCGI using SRB3. The condTriggerConfig is used for CHO or CPC configuration.
[...]

EventTriggerConfig field descriptions a3-Offset/a6-Offset
Offset value(s) to be used in NR measurement report triggering condition for event a3/a6. The actual value is field value * 0.5 dB.
aN-ThresholdM
Threshold value associated to the selected trigger quantity (e.g. RSRP, RSRQ, SINR) per RS Type (e.g. SS/PBCH block, CSI-RS) to be used in NR measurement report triggering condition for event number aN. If multiple thresholds are defined for event number aN, the thresholds are differentiated by M. The network configures aN-Threshold1 only for events A1, A2, A4, A5 and a5-Threshold2 only for event A5. In the same eventA5, the network configures the same quantity for the MeasTriggerQuantity of the a5-Threshold1 and for the MeasTriggerQuantity of the a5-Threshold2.
channelOccupancyThreshold
RSSI threshold which is used for channel occupancy evaluation.
eventId
Choice of NR event triggered reporting criteria.
maxNrofRS-IndexesToReport
Max number of RS indexes to include in the measurement report for A1-A6 events.
maxReportCells
Max number of non-serving cells to include in the measurement report.
reportAddNeighMeas
Indicates that the UE shall include the best neighbour cells per serving frequency.
reportAmount
Numbered measurement reports applicable for eventTriggered as well as for periodical report types.
reportOnLeave
Indicates whether or not the UE shall initiate the measurement reporting procedure when the leaving condition is met for a cell in cellsTriggeredList, as specified in 5.5.4.1.
reportQuantityCell
The cell measurement quantities to be included in the measurement report.
reportQuantityRS-Indexes
Indicates which measurement information per RS index the UE shall include in the measurement report.
timeToTrigger -continued Time during which specific criteria for the event needs to be met in order to trigger a measurement report.
useT312
If value TRUE is configured, the UE shall use the timer T312 with the value t312 as specified in the corresponding measObjectNR. If value FALSE is configured, the timer T312 is considered as disabled. Network configures value TRUE only if reportType is set to eventTriggered.
useWhiteCellList
Indicates whether only the cells included in the white-list of the associated measObject are applicable as specified in 5.5.4.1.
[...]

PeriodicalReportConfig field descriptions maxNrofRS-IndexesToReport
Max number of RS indexes to include in the measurement report.
maxReportCells
Max number of non-serving cells to include in the measurement report.
reportAddNeighMeas
Indicates that the UE shall include the best neighbour cells per serving frequency.
reportAmount
Number of measurement reports applicable for eventTriggered as well as for periodical report types
reportQuantityCell
The cell measurement quantities to be included in the measurement report.
reportQuantityRS-Indexes
Indicates which measurement information per RS index the UE shall include in the measurement report.
ul-DelayValueConfig
If the field is present, the UE shall perform the actual UL PDCP Packet Average Delay measurement per DRB as specified in TS 38.314 [53] and the UE shall ignore the fields reportQuantityCell and maxReportCells. The applicable values for the corresponding reportInterval are (one of the) {ms120, ms240, ms480, ms640, ms1024, ms2048, ms5120, ms10240, ms20480, ms40960, min1,min6, min12, min30}. The reportInterval indicates the periodicity for performing and reporting of UL PDCP Packet Average Delay per DRB measurement as specified in TS 38.314 [53].
useWhiteCellList
Indicates whether only the cells included in the white-list of the associated measObject are applicable as specified in 5.5.4.1.

********************************* Next Quotation *********************************
-                     ReportConfigToAddModList
The IE ReportConfigToAddModList concerns a list of reporting configurations to add or modify.
ReportConfigToAddModList information element

```
ReportConfigToAddModList ::=        SEQUENCE (SIZE (1..maxReportConfigId)) OF ReportConfigToAddMod
ReportConfigToAddMod ::=            SEQUENCE {
    reportConfigId                      ReportConfigId,
    reportConfig                        CHOICE {
        reportConfigNR                      ReportConfigNR,
        ...,
        reportConfigInterRAT                ReportConfigInterRAT,
        reportConfigNR-SL-r16               ReportConfigNR-SL-r16
    }
}
```
********************************* Quotation End *********************************

The NTN status report including agreements from 3GPP RAN2 #115 meeting is quoted as below from [4] RP-211774, "Status Report to TSG":
********************************* Quotation Start [4] *********************************
2.2   RAN2
2.2.1   Agreements
[...]
2.   If the reported content of information about UE specific TA is UE location information in connected mode, RRC signalling is used to report.
1.   Under the work assumption "the UE location information can be reported in connected mode", for TA reporting purposes in connected mode, the network can configure the UE to send either the UE specific TA pre-compensation (for the details of the TA value, confirmation from RAN1 is needed) or the UE location information
[...]
Working Assumptions: Specify that measurement reports can be configured to be piggybacked with location report when location based event triggers it
[...]
4.   After AS security is established, gNB can obtain a GNSS-based location information from the UE using existing signalling method, i.e., by configuring includeCommonLocationInfo in the corresponding reportConfig. It is up to SA3 to decide whether User Consent is required before NW acquires location information from the UE in NTN. RAN2 discuss whether to send LS to SA3
5.   Aperiodic location reporting (e.g., via DCI) is not supported.
Working assumption: Event triggered-based UE location reporting are configured by gNB to obtain UE location update of mobile UEs in RRC_CONNECTED
1.   Send new LS to SA3 for the need of NTN specific user consent for obtaining UE location by gNB.
1.   If accepted by SA3, if the gNB has user consent to obtain UE location in NTN, reporting of finer location information/full GNSS coordinates in RRC_CONNECTED can be supported after AS security is enabled 2. Periodic location reporting can also be configured by gNB to obtain UE location update of mobile UEs in RRC_CONNECTED. RAN2 discuss whether it is part of existing periodic measurement report configuration or a new configuration for periodic reporting of UE location.
\*\*\*\*\*\*\*\*\*\*\*\*\*\*\*\*\*\*\*\*\*\*\*\*\*\*\*\*\*\*\*\*\*\*\*\*\*\*\*\* Quotation End \*\*\*\*\*\*\*\*\*\*\*\*\*\*\*\*\*\*\*\*\*\*\*\*\*\*\*\*\*\*\*\*\*\*\*\*\*\*\*\*

The measurement report, SMTC and some related configurations are specified in [2] 3GPP TS 38.331 V16.5.0, "NR, RRC protocol specification" with a NTN running CR, e.g., [3] R2-2111614, "Stage-3 running RRC CR for NTN Rel-17" as below:
\*\*\*\*\*\*\*\*\*\*\*\*\*\*\*\*\*\*\*\*\*\*\*\*\*\*\*\*\*\*\*\*\*\*\*\*\*\*\*\* Quotation Start [2] \*\*\*\*\*\*\*\*\*\*\*\*\*\*\*\*\*\*\*\*\*\*\*\*\*\*\*\*\*\*\*\*\*\*\*\*\*\*\*\*

5.5.2.10    Reference signal measurement timing configuration

The UE shall setup the first SS/PBCH block measurement timing configuration (SMTC) in accordance with the received periodicityAndOffset parameter (providing Periodicity and Offset value for the following condition) in the smtc1 configuration. The first subframe of each SMTC occasion occurs at an SFN and subframe of the NR SpCell meeting the following condition:
    SFN mod T = (FLOOR (Offset/10));
    if the Periodicity is larger than sf5:
        subframe = Offset mod 10;
    else:
        subframe = Offset or {Offset +5};
    with T = CEIL(Periodicity/10).

If smtc2 is present, for cells indicated in the pci-List parameter in smtc2 in the same MeasObjectNR, the UE shall setup an additional SS/PBCH block measurement timing configuration (SMTC) in accordance with the received periodicity parameter in the smtc2 configuration and use the Offset (derived from parameter periodicityAndOffset) and duration parameter from the smtc1 configuration. The first subframe of each SMTC occasion occurs at an SFN and subframe of the NR SpCell meeting the above condition.

If smtc2-LP is present, for cells indicated in the pci-List parameter in smtc2-LP in the same frequency (for intra frequency cell reselection) or different frequency (for inter frequency cell reselection), the UE shall setup an additional SS/PBCH block measurement timing configuration (SMTC) in accordance with the received periodicity parameter in the smtc2-LP configuration and use the Offset (derived from parameter periodicityAndOffset) and duration parameter from the smtc configuration for that frequency. The first subframe of each SMTC occasion occurs at an SFN and subframe of the NR SpCell or serving cell (for cell reselection) meeting the above condition.

If smtc3list is present, for cells indicated in the pci-List parameter in each SSB-MTC3 element of the list in the same MeasObjectNR, the IAB-MT shall setup an additional SS block measurement timing configuration in accordance with the received periodicityAndOffset parameter (using same condition as smtc1 to identify the SFN and the subframe for SMTC occasion) in each SSB-MTC3 configuration and use the duration and ssb-ToMeasure parameters from each SSB-MTC3 configuration.

On the indicated ssbFrequency, the UE shall not consider SS/PBCH block transmission in subframes outside the SMTC occasion for RRM measurements based on SS/PBCH blocks and for RRM measurements based on CSI-RS except for SFTD measurement (see TS 38.133 [14], subclause 9.3.8).
\*\*\*\*\*\*\*\*\*\*\*\*\*\*\*\*\*\*\*\*\*\*\*\*\*\*\*\*\*\*\*\*\*\*\*\*\*\*\*\* Quotation End \*\*\*\*\*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*\*\*\*\*\*\*\*\*\*\*\*\*\*\*\*\*\*\*\*\*\*\*\*\*\*\*\*\*\*\*\* Quotation Start [3] \*\*\*\*\*\*\*\*\*\*\*\*\*\*\*\*\*\*\*\*\*\*\*\*\*\*\*\*\*\*\*\*\*\*\*\*\*\*\*\*

- MeasObjectNR

The IE MeasObjectNR specifies information applicable for SS/PBCH block(s) intra/inter-frequency measurements and/or CSI-RS intra/inter-frequency measurements.

MeasObjectNR information element

```
MeasObjectNR ::=                                      SEQUENCE {
    ssbFrequency                                          ARFCN-ValueNR
OPTIONAL,             -- Cond SSBorAssociatedSSB
    ssbSubcarrierSpacing                                  SubcarrierSpacing
OPTIONAL,             -- Cond SSBorAssociatedSSB
    smtc1                                                 SSB-MTC
OPTIONAL,             -- Cond SSBorAssociatedSSB
    smtc2                                                 SSB-MTC2
OPTIONAL,             -- Cond IntraFreqConnected
    refFreqCSI-RS                                         ARFCN-ValueNR
OPTIONAL,             -- Cond CSI-RS
    referenceSignalConfig                                 ReferenceSignalConfig,
    absThreshSS-BlocksConsolidation                       ThresholdNR
OPTIONAL,             -- Need R
    absThreshCSI-RS-Consolidation                         ThresholdNR
OPTIONAL,             -- Need R
    nrofSS-BlocksToAverage                                INTEGER (2..maxNrofSS-BlocksToAverage)
OPTIONAL,             -- Need R
    nrofCSI-RS-ResourcesToAverage                         INTEGER (2..maxNrofCSI-RS-ResourcesToAverage)
OPTIONAL,             -- Need R
    quantityConfigIndex                                   INTEGER (1..maxNrofQuantityConfig),
    offsetMO                                              Q-OffsetRangeList,
    cellsToRemoveList                                     PCI-List
OPTIONAL,             -- Need N
    cellsToAddModList                                     CellsToAddModList
OPTIONAL,             -- Need N
    blackCellsToRemoveList                                PCI-RangeIndexList
OPTIONAL,             -- Need N
    blackCellsToAddModList                                SEQUENCE (SIZE (1..maxNrofPCI-Ranges)) OF PCI-RangeElement
```

```
OPTIONAL,                   -- Need N
        whiteCellsToRemoveList                          PCI-RangeIndexList
OPTIONAL,                   -- Need N
        whiteCellsToAddModList                          SEQUENCE (SIZE (1..maxNrofPCI-Ranges)) OF PCI-RangeElement
OPTIONAL,                   -- Need N
        ...,
        freqBandIndicatorNR                             FreqBandIndicatorNR
OPTIONAL,                   -- Need R
        measCycleSCell                                  ENUMERATED {sf160, sf256, sf320, sf512, sf640, sf1024,
sf1280}              OPTIONAL         -- Need R
        ,
        [[
        smtc3list-r16                                   SSB-MTC3List-r16
OPTIONAL,                   -- Need R
        rmtc-Config-r16                                 SetupRelease {RMTC-Config-r16}
OPTIONAL,                   -- Need M
        t312-r16                                        SetupRelease { T312-r16 }
OPTIONAL                    -- Need M
        ]] ,
        smtc4List-r17                                   SSB-MTC4List-r17        OPTIONAL    --
Cond SSBorAssociatedSSB
}
SSB-MTC3List-r16::=                                     SEQUENCE (SIZE (1..4)) OF SSB-MTC3-r16
SSB-MTC4List-r17::=                                     SEQUENCE (SIZE (1..4)) OF SSB-MTC4-r17
T312-r16 ::=                                            ENUMERATED { ms0, ms50, ms100, ms200, ms300, ms400, ms500,
ms1000}
ReferenceSignalConfig::=                                SEQUENCE {
        ssb-ConfigMobility                              SSB-ConfigMobility
OPTIONAL,                   -- Need M
        csi-rs-ResourceConfigMobility                   SetupRelease { CSI-RS-ResourceConfigMobility }
OPTIONAL                    -- Need M
}
SSB-ConfigMobility::=                                   SEQUENCE {
        ssb-ToMeasure                                   SetupRelease { SSB-ToMeasure }
OPTIONAL,                   -- Need M
        deriveSSB-IndexFromCell                         BOOLEAN,
        ss-RSSI-Measurement                             SS-RSSI-Measurement
OPTIONAL,                   -- Need M
        ...,
        ssb-PositionQCL-Common-r16                      SSB-PositionQCL-Relation-r16
OPTIONAL,                   -- Cond SharedSpectrum
        ssb-PositionQCL-CellsToAddModList-r16           SSB-PositionQCL-CellsToAddModList-r16
OPTIONAL,                   -- Need N
        ssb-PositionQCL-CellsToRemoveList-r16           PCI-List
OPTIONAL                    -- Need N
}
Q-OffsetRangeList ::=                                   SEQUENCE {
        rsrpOffsetSSB                                   Q-OffsetRange           DEFAULT dB0,
        rsrqOffsetSSB                                   Q-OffsetRange           DEFAULT dB0,
        sinrOffsetSSB                                   Q-OffsetRange           DEFAULT dB0,
        rsrpOffsetCSI-RS                                Q-OffsetRange           DEFAULT dB0,
        rsrqOffsetCSI-RS                                Q-OffsetRange           DEFAULT dB0,
        sinrOffsetCSI-RS                                Q-OffsetRange           DEFAULT dB0
}
ThresholdNR ::=                                         SEQUENCE{
        thresholdRSRP                                   RSRP-Range
OPTIONAL,                   -- Need R
        thresholdRSRQ                                   RSRQ-Range
OPTIONAL,                   -- Need R
        thresholdSINR                                   SINR-Range
OPTIONAL                    -- Need R
}
CellsToAddModList ::=                                   SEQUENCE (SIZE (1..maxNrofCellMeas)) OF CellsToAddMod
CellsToAddMod ::=                                       SEQUENCE {
        physCellId                                      PhysCellId,
        cellIndividualOffset                            Q-OffsetRangeList
}
RMTC-Config-r16 ::=                                     SEQUENCE {
        rmtc-Periodicity-r16                            ENUMERATED {ms40, ms80, ms160, ms320, ms640},
        rmtc-SubframeOffset-r16                         INTEGER(0..639)
```

```
OPTIONAL,                              -- Need M
    measDurationSymbols-r16            ENUMERATED {sym1, sym14or12, sym28or24, sym42or36,
sym70or60},
    rmtc-Frequency-r16                 ARFCN-ValueNR,
    ref-SCS-CP-r16                     ENUMERATED {kHz15, kHz30, kHz60-NCP, kHz60-ECP},
    ...
}
SSB-PositionQCL-CellsToAddModList-r16 ::=   SEQUENCE (SIZE (1..maxNrofCellMeas)) OF SSB-PositionQCL-
CellsToAddMod-r16
SSB-PositionQCL-CellsToAddMod-r16 ::=  SEQUENCE {
    physCellId-r16                        PhysCellId,
    ssb-PositionQCL-r16                   SSB-PositionQCL-Relation-r16
}
```

| CellsToAddMod field descriptions |
|---|
| cellIndividualOffset<br>Cell individual offsets applicable to a specific cell.<br>physCellId<br>Physical cell identity of a cell in the cell list. |

| MeasObjectNR field descriptions |
|---|
| absThreshCSI-RS-Consolidation<br>Absolute threshold for the consolidation of measurement results per CSI-RS resource(s) from L1 filter(s). The field is used for the derivation of cell measurement results as described in 5.5.3.3 and the reporting of beam measurement information per CSI-RS resource as described in 5.5.5.2.<br>absThreshSS-BlocksConsolidation<br>Absolute threshold for the consolidation of measurement results per SS/PBCH block(s) from L1 filter(s). The field is used for the derivation of cell measurement results as described in 5.5.3.3 and the reporting of beam measurement information per SS/PBCH block index as described in 5.5.5.2.<br>blackCellsToAddModList<br>List of cells to add/modify in the black list of cells. It applies only to SSB resources.<br>blackCellsToRemoveList<br>List of cells to remove from the black list of cells.<br>cellsToAddModList<br>List of cells to add/modify in the cell list.<br>cellsToRemoveList<br>List of cells to remove from the cell list.<br>freqBandIndicatorNR<br>The frequency band in which the SSB and/or CSI-RS indicated in this MeasObjectNR are located and according to which the UE shall perform the RRM measurements. This field is always provided when the network configures measurements with this MeasObjectNR.<br>measCycleSCell<br>The parameter is used only when an SCell is configured on the frequency indicated by the measObjectNR and is in deactivated state, see TS 38.133 [14]. gNB configures the parameter whenever an SCell is configured on the frequency indicated by the measObjectNR, but the field may also be signalled when an SCell is not configured. Value sf160 corresponds to 160 sub-frames, value sf256 corresponds to 256 sub-frames and so on.<br>nrofCSInrofCSI-RS-ResourcesToAverage<br>Indicates the maximum number of measurement results per beam based on CSI-RS resources to be averaged. The same value applies for each detected cell associated with this MeasObjectNR.<br>nrofSS-BlocksToAverage<br>Indicates the maximum number of measurement results per beam based on SS/PBCH blocks to be averaged. The same value applies for each detected cell associated with this MeasObject.<br>offsetMO<br>Offset values applicable to all measured cells with reference signal(s) indicated in this MeasObjectNR.<br>quantityConfigIndex<br>Indicates the n-th element of quantityConfigNR-List provided in MeasConfig.<br>referenceSignalConfig<br>RS configuration for SS/PBCH block and CSI-RS.<br>refFreqCSI-RS<br>Point A which is used for mapping of CSI-RS to physical resources according to TS 38.211 [16] clause 7.4.1.5.3.<br>smtc1<br>Primary measurement timing configuration. (see clause 5.5.2.10).<br>smtc2<br>Secondary measurement timing configuration for SS corresponding to this MeasObjectNR with PCI listed in pci-List. For these SS, the periodicity is indicated by periodicity in smtc2 and the timing offset is equal to the offset indicated in periodicityAndOffset modulo periodicity. periodicity in smtc2 can only be set to a value strictly shorter than the periodicity indicated by periodicityAndOffset in smtc1 (e.g. if periodicityAndOffset indicates sf10, periodicity can only be set of sf5, if periodicityAndOffset indicates sf5, smtc2 cannot be configured).<br>smtc3list<br>Measurement timing configuration list for SS corresponding to IAB-MT. This is used for the IAB-node's discovery of other IAB-nodes and the IAB-Donor-DUs.<br>smtc4List<br>Measurement timing configuration list for NTN deployments. Details FFS. FFS whether smtc1 or smtc2 can be configured with this.<br>ssbFrequency<br>Indicates the frequency of the SS associated to this MeasObjectNR. For operation with shared spectrum channel access, this field is a k*30 kHz shift from the sync raster where k = 0,1,2, and so on if the reportType within the corresponding ReportConfigNR is set to reportCGI (see TS 38.211 [16], clause 7.4.3.1). Frequencies are considered to be on the sync raster if they are also identifiable with a GSCN value (see TS 38.101-1 [15]). | ssb-PositionQCL-Common
Indicates the QCL relationship between SS/PBCH blocks for all measured cells as specified in TS 38.213 [13], clause 4.1.
ssbSubcarrierSpacing
Subcarrier spacing of SSB. Only the values 15 kHz or 30 kHz (FR1), and 120 kHz or 240 kHz (FR2) are applicable.
t312
The value of timer T312. Value ms0 represents 0 ms, ms50 represents 50 ms and so on.
whiteCellsToAddModList
List of cells to add/modify in the white list of cells. It applies only to SSB resources.
whiteCellsToRemoveList
List of cells to remove from the white list of cells.

[...]

SSB-ConfigMobility field descriptions deriveSSB-IndexFromCell
If this field is set to true, UE assumes SFN and frame boundary alignment across cells on the same frequency carrier as specified in TS 38.133 [14]. Hence, if the UE is configured with a serving cell for which (absoluteFrequencySSB, subcarrierSpacing) in ServingCellConfigCommon is equal to (ssbFrequency, ssbSubcarrierSpacing) in this MeasObjectNR, this field indicates whether the UE can utilize the timing of this serving cell to derive the index of SS block transmitted by neighbour cell. Otherwise, this field indicates whether the UE may use the timing of any detected cell on that target frequency to derive the SSB index of all neighbour cells on that frequency.
ssb-ToMeasure
The set of SS blocks to be measured within the SMTC measurement duration. The first/leftmost bit corresponds to SS/PBCH block index 0, the second bit corresponds to SS/PBCH block index 1, and so on. Value 0 in the bitmap indicates that the corresponding SS/PBCH block is not to be measured while value 1 indicates that the corresponding SS/PBCH block is to be measured (see TS 38.215 [9]). When the field is not configured the UE measures on all SS blocks. Regardless of the value of this field, SS/PBCH blocks outside of the applicable smtc are not to be measured. See TS 38.215 [9] clause 5.1.1.

[...]

| Conditional Presence | Explanation |
| --- | --- |
| CSI-RS | This field is mandatory present if csi-rs-ResourceConfigMobility is configured, otherwise, it is absent. |
| SSBorAssociatedSSB | This field is mandatory present if ssb-ConfigMobility is configured or associatedSSB is configured in at least one cell. Otherwise, it is absent, Need R. |
| IntraFreqConnected | This field is optionally present, Need R if the UE is configured with a serving cell for which (absoluteFrequencySSB, subcarrierSpacing) in ServingCellConfigCommon is equal to (ssbFrequency, ssbSubcarrierSpacing) in this MeasObjectNR, otherwise, it is absent. |
| SharedSpectrum | This field is mandatory present if this MeasObject is for a frequency which operates with shared spectrum channel access. Otherwise, it is absent, Need R. |

**************************************** Next Quotation ****************************************

ReportConfigNR
The IE ReportConfigNR specifies criteria for triggering of an NR measurement reporting event or of a CHO or CPC event. For events labelled AN with N equal to 1, 2 and so on, measurement reporting events and CHO or CPC events are based on cell measurement results, which can either be derived based on SS/PBCH block or CSI-RS.

Event A1: Serving becomes better than absolute threshold;
Event A2: Serving becomes worse than absolute threshold;
Event A3: Neighbour becomes amount of offset better than PCell/PSCell;
Event A4: Neighbour becomes better than absolute threshold;
Event A5: PCell/PSCell becomes worse than absolute threshold1 AND Neighbour/SCell becomes better than another absolute threshold2;
Event A6: Neighbour becomes amount of offset better than SCell;
Event D1: Distance between UE and a reference location referenceLocation1 becomes larger than configured threshold11 Thresh1 and distance between UE and a reference location referenceLocation2 becomes shorter than configured threshold Thresh2
CondEvent A3: Conditional reconfiguration candidate becomes amount of offset better than PCell/PSCell;
CondEvent A4: Conditional reconfiguration candidate becomes better than absolute threshold;
CondEvent A5: PCell/PSCell becomes worse than absolute threshold1 AND Conditional reconfiguration candidate becomes better than another absolute threshold2;
CondEvent D1: Distance between UE and a reference location referenceLocation1 becomes larger than configured threshold Thresh1 and distance between UE and a reference location referenceLocation2 of conditional reconfiguration candidate becomes shorter than configured threshold Thresh2;
CondEvent T1: Time measured at UE becomes more than configured threshold Thresh1 but is less than Thresh2;
CondEvent A3: Conditional reconfiguration candidate becomes amount of offset better than PCell/PSCell;
CondEvent A5: PCell/PSCell becomes worse than absolute threshold1 AND Conditional reconfiguration candidate becomes better than another absolute threshold2;

For event I1, measurement reporting event is based on CLI measurement results, which can either be derived based on SRS-RSRP or CLI-RSSI.

Event I1: Interference becomes higher than absolute threshold.

| ReportConfigNR information element |
|---|

```
ReportConfigNR ::=                                  SEQUENCE {
        reportType                                      CHOICE {
                periodical                                      PeriodicalReportConfig,
                eventTriggered                                  EventTriggerConfig,
                ...,
                reportCGI                                       ReportCGI,
                reportSFTD                                      ReportSFTD-NR,
                condTriggerConfig-r16                           CondTriggerConfig-r16,
                cli-Periodical-r16                              CLI-PeriodicalReportConfig-r16,
                cli-EventTriggered-r16                          CLI-EventTriggerConfig-r16
        }
}
[...]
CondTriggerConfig-r16 ::=           SEQUENCE {
        condEventId                     CHOICE {
                condEventA3                     SEQUENCE {
                        a3-Offset                       MeasTriggerQuantityOffset,
                        hysteresis                      Hysteresis,
                        timeToTrigger                   TimeToTrigger
                },
                condEventA5                     SEQUENCE {
                        a5-Threshold1                   MeasTriggerQuantity,
                        a5-Threshold2                   MeasTriggerQuantity,
                        hysteresis                      Hysteresis,
                        timeToTrigger                   TimeToTrigger
                },
                ...,
                condEventA4-r17                                 SEQUENCE {
                        a4-Threshold-r17                                MeasTriggerQuantity-r17
                        hysteresis-r17                                  Hysteresis-r17,
                        timeToTrigger-r17                               TimeToTrigger-r17,
                        useWhiteCellList-r17                            BOOLEAN
                },
                condEventD1-r17                 SEQUENCE {
                        distanceThresFromReference1-r17                 TypeFFS,
                        distanceThresFromReference2-r17                 TypeFFS,
                        referenceLocation1-r17                          ReferenceLocation-r17,
                        referenceLocation2-r17                          ReferenceLocation-r17
                        hysteresis-r17                                  HysteresisLocation-r17,
                        timeToTrigger-r17                               TimeToTrigger-r17
                },
                condEventT1-r17                 SEQUENCE {
                        t1-Threshold-r17                        INTEGER (0..549755813887),
                        duration-r17                            INTEGRE (ValueFFS)
                }
        },
        rsType-r16                      NR-RS-Type,
        ...
}
EventTriggerConfig::=                               SEQUENCE {
        eventId                                         CHOICE {
                eventA1                                         SEQUENCE {
                        a1-Threshold                                    MeasTriggerQuantity,
                        reportOnLeave                                   BOOLEAN,
                        hysteresis                                      Hysteresis,
                        timeToTrigger                                   TimeToTrigger
                },
                eventA2                                         SEQUENCE {
                        a2-Threshold                                    MeasTriggerQuantity,
                        reportOnLeave                                   BOOLEAN,
                        hysteresis                                      Hysteresis,
                        timeToTrigger                                   TimeToTrigger
                },
                eventA3                                         SEQUENCE {
                        a3-Offset                                       MeasTriggerQuantityOffset,
                        reportOnLeave                                   BOOLEAN,
                        hysteresis                                      Hysteresis,
                        timeToTrigger                                   TimeToTrigger,
                        useWhiteCellList                                BOOLEAN
                },
                eventA4                                         SEQUENCE {
                        a4-Threshold                                    MeasTriggerQuantity,
                        reportOnLeave                                   BOOLEAN,
                        hysteresis                                      Hysteresis,
                        timeToTrigger                                   TimeToTrigger,
                        useWhiteCellList                                BOOLEAN
                },
                eventA5                                         SEQUENCE {
                        a5-Threshold1                                   MeasTriggerQuantity,
```

```
            a5-Threshold2                            MeasTriggerQuantity,
            reportOnLeave                            BOOLEAN,
            hysteresis                               Hysteresis,
            timeToTrigger                            TimeToTrigger,
            useWhiteCellList                         BOOLEAN
        },
        eventA6                                  SEQUENCE {
            a6-Offset                                MeasTriggerQuantityOffset,
            reportOnLeave                            BOOLEAN,
            hysteresis                               Hysteresis,
            timeToTrigger                            TimeToTrigger,
            useWhiteCellList                         BOOLEAN
        },
        ... ,
        eventD1-r17                              SEQUENCE {
            distanceThresFromReference1-r17          FFS,
            distanceThresFromReference2-r17          FFS            OPTIONAL,    --Need R
            referenceLocation1-r17                   ReferenceLocation-r17,
            referenceLocation2-r17                   ReferenceLocation-r17    OPTIONAL,    --Need R
            hysteresis-r17                           HysteresisLocation-r17,
            timeToTrigger-r17                        TimeToTrigger-r17
        }
    },
    rsType                                       NR-RS-Type,
    reportInterval                               ReportInterval,
    reportAmount                                 ENUMERATED {r1, r2, r4, r8, r16, r32, r64, infinity},
    reportQuantityCell                           MeasReportQuantity,
    maxReportCells                               INTEGER (1..maxCellReport),
    reportQuantityRS-Indexes                         MeasReportQuantity
OPTIONAL,           -- Need R
    maxNrofRS-IndexesToReport                    INTEGER (1..maxNrofIndexesToReport)
OPTIONAL,           -- Need R
    includeBeamMeasurements                      BOOLEAN,
    reportAddNeighMeas                           ENUMERATED {setup}
OPTIONAL,           -- Need R
[...]
}
[...]
NR-RS-Type ::=                                   ENUMERATED (ssb, csi-rs}
MeasTriggerQuantity ::=                          CHOICE {
    rsrp                                             RSRP-Range,
    rsrq                                             RSRQ-Range,
    sinr                                             SINR-Range
}
MeasTriggerQuantityOffset ::=                    CHOICE {
    rsrp                                             INTEGER (–30..30),
    rsrq                                             INTEGER (–30..30),
    sinr                                             INTEGER (–30..30)
}
MeasReportQuantity ::=                           SEQUENCE {
    rsrp                                             BOOLEAN,
    rsrq                                             BOOLEAN,
    sinr                                             BOOLEAN
}
[...]
ReferenceLocation-r17             ::=            TypeFFS
                                    CondTriggerConfig field descriptions
``` a3-Offset
Offset value(s) to be used in NR conditional reconfiguration triggering condition for cond event a3. The actual value is field value * 0.5 dB.
a5-Threshold1/a5-Threshold2
Threshold value associated to the selected trigger quantity (e.g. RSRP, RSRQ, SINR) per RS Type (e.g. SS/PBCH block, CSI-RS) to be used in NR conditional reconfiguration triggering condition for cond event a5. In the same condeventA5, the network configures the same quantity for the MeasTriggerQuantity of the a5-Threshold1 and for the MeasTriggerQuantity of the a5-Threshold2.
condEventId
Choice of NR conditional reconfiguration event triggered criteria.
referenceLocation1, referenceLocation2
Reference locations used for location based event. The referenceLocation1 is associated to serving cell and referenceLocation2 is associated to candidate target cell.
timeToTrigger
Time during which specific criteria for the event needs to be met in order to execute the conditional reconfiguration evaluation.
[...]

| EventTriggerConfig field descriptions |
| --- |
| a3-Offset/a6-Offset<br>Offset value(s) to be used in NR measurement report triggering condition for event a3/a6. The actual value is field value * 0.5 dB.<br>aN-ThresholdM<br>Threshold value associated to the selected trigger quantity (e.g. RSRP, RSRQ, SINR) per RS Type (e.g. SS/PBCH block, CSI-RS) to be used in NR measurement report triggering condition for event number aN. If multiple thresholds are defined for event number aN, the thresholds are differentiated by M. The network configures aN-Threshold1 only for events A1, A2, A4, A5 and a5-Threshold2 only for event A5. In the same eventA5, the network configures the same quantity for the MeasTriggerQuantity of the a5-Threshold1 and for the MeasTriggerQuantity of the a5-Threshold2.<br>channelOccupancyThreshold<br>RSSI threshold which is used for channel occupancy evaluation.<br>eventId<br>Choice of NR event triggered reporting criteria.<br>maxNrofRS-IndexesToReport<br>Max number of RS indexes to include in the measurement report for A1-A6 events.<br>maxReportCells<br>Max number of non-serving cells to include in the measurement report.<br>reportAddNeighMeas<br>Indicates that the UE shall include the best neighbour cells per serving frequency.<br>reportAmount<br>Number of measurement reports applicable for eventTriggered as well as for periodical report types.<br>reportOnLeave<br>Indicates whether or not the UE shall initiate the measurement reporting procedure when the leaving condition is met for a cell in cellsTriggeredList, as specified in 5.5.4.1.<br>reportQuantityCell<br>The cell measurement quantities to be included in the measurement report.<br>reportQuantityRS-Indexes<br>Indicates which measurement information per RS index the UE shall include in the measurement report.<br>timeToTrigger<br>Time during which specific criteria for the event needs to be met in order to trigger a measurement report.<br>useT312<br>If value TRUE is configured, the UE shall use the timer T312 with the value t312 as specified in the corresponding measObjectNR. If value FALSE is configured, the timer T312 is considered as disabled. Network configures value TRUE only if reportType is set to eventTriggered.<br>useWhiteCellList<br>Indicates whether only the cells included in the white-list of the associated measObject are applicable as specified in 5.5.4.1. |

\*\*\*\*\*\*\*\*\*\*\*\*\*\*\*\*\*\*\*\*\*\*\*\*\*\*\*\*\*\*\*\*\*\*\*\*\*\* Next Quotation \*\*\*\*\*\*\*\*\*\*\*\*\*\*\*\*\*\*\*\*\*\*\*\*\*\*\*\*\*\*\*\*\*\*\*\*\*\*

- SSB-MTC

The IE SSB-MTC is used to configure measurement timing configurations, i.e., timing occasions at which the UE measures SSBs.

| SSB-MTC information element |
| --- |

```
SSB-MTC ::=                           SEQUENCE {
        periodicityAndOffset          CHOICE {
              sf5                     INTEGER (0..4),
              sf10                        INTEGER (0..9),
              sf20                        INTEGER (0..19),
              sf40                        INTEGER (0..39),
              sf80                        INTEGER (0..79),
              sf160                       INTEGER (0..159)
        },
        duration                      ENUMERATED { sf1, sf2, sf3, sf4, sf5 }
}
SSB-MTC2 ::=                          SEQUENCE {
        pci-List                      SEQUENCE (SIZE (1..maxNrofPCIsPerSMTC)) OF PhysCellId
OPTIONAL,          -- Need M
        periodicity                   ENUMERATED {sf5, sf10, sf20, sf40, sf80, spare3, spare2,
spare1}
}
SSB-MTC2-LP-r16 ::=                   SEQUENCE {
        pci-List                      SEQUENCE (SIZE (1..maxNrofPCIsPerSMTC)) OF PhysCellId
OPTIONAL,          -- Need R
        periodicity                   ENUMERATED {sf10, sf20, sf40, sf80, sf160, spare3, spare2
spare1}
}
SSB-MTC3-r16 ::=                      SEQUENCE {
        periodicityAndOffset-r16      CHOICE {
              sf5-r16                       INTEGER (0..4),
              sf10-r16                      INTEGER (0..9),
              sf20-r16                      INTEGER (0..19),
              sf40-r16                      INTEGER (0..39),
              sf80-r16                      INTEGER (0..79),
              sf160-r16                     INTEGER (0..159),
```

```
            sf320-r16                        INTEGER (0..319),
            sf640-r16                        INTEGER (0..639),
            sf1280-r16                       INTEGER (0..1279)
        },
        duration-r16                         ENUMERATED {sf1, sf2, sf3, sf4, sf5},
        pci-List-r16                         SEQUENCE (SIZE (1..maxNrofPCIsPerSMTC)) OF PhysCellId
OPTIONAL,           -- Need M
ssb-ToMeasure-r16                            SetupRelease { SSB-ToMeasure }
OPTIONAL            -- Need M
}
SSB-MTC4-r17 ::=                    SEQUENCE {
        pci-List                             SEQUENCE (SIZE (1..maxNrofPCIsPerSMTC)) OF PhysCellId
OPTIONAL,           -- Need R
        offset                               INTEGER (0..1279)
}
                                        SSB-MTC3 field descriptions
``` duration
Duration of the measurement window in which to receive SS/PBCH blocks. It is given in number of subframes (see TS 38.213 [13], clause 4.1).
pci-List
PCIs that are known to follow this SMTC, used for IAB-node discovery.
periodicityAndOffset
Periodicity and offset of the measurement window in which to receive SS/PBCH blocks, see 5.5.2.10. Periodicity and offset are given in number of subframes.
ssb-ToMeasure
The set of SS blocks to be measured within the SMTC measurement duration. The first/leftmost bit corresponds to SS block index 0, the second bit corresponds to SS block index 1, and so on. Value 0 in the bitmap indicates that the corresponding SS block is not to be measured while value 1 indicates that the corresponding SS block is to be measured (see TS 38.215 [9]). When the field is not configured the IAB-MT measures on all SS blocks. Regardless of the value of this field, SS blocks outside of the applicable smtc are not to be measured. See TS 38.215 [9] clause 5.1.1.
************************************* Quotation End *************************************

In addition, the following agreements have also been reached in the past 3GPP RAN2 meetings, e.g., [8] R2-2111333, "[116-e][103][NTN] SMTC/gaps (Nokia)" and [9] RP-212803, "Status report WI NR-NTN-solutions":

For Rel-17 NTN, Rel-17 NR operation is enhanced (e.g., the SMTC configuration and UE measurement gap configuration) aiming to address the issues associated with the different/larger propagation delays, and the satellites (considering e.g., their deployment, mobility, height, minimum elevation and prioritizing typical NTN scenarios).

Rel-17 NTN will not rely only on network implementation to address the issue explained in agreement 1.

Enhancements of the SMTC configuration is supported for Rel-17 NTN.

Optional new UE assistance is defined in Rel-17 NTN for network to properly (re)configure the SMTC and/or measurement gap.

For Rel-17 NTN, one or more SMTC configuration(s) associated to one frequency can be configured. FFS solution details.

The SMTC configuration can be associated with a set of cells (e.g., per satellite or any other suitable set per gNB determination).

The multiple SMTC configurations are enabled by introducing different new offsets in addition to the legacy SMTC configuration. FFS how the offsets will be managed/signalled.

The configuration of one or multiple offsets is left up to the network implementation.

It is up to network to update the SMTC configuration of the UE to accommodate the different propagation delays.

The specific maximum number of SMTC configuration in one measurement object with the same ssbFrequency can be 4. And a LS will be sent to RAN4 to confirm the conclusion.

In NTN, NW-based solution is supported, i.e. the final SMTC/measurement gap configuration is generated and provided by NW in NTN to a given UE (based on the propagation delay difference between at least one target cell and the serving cell of a given UE). FFS whether UE-based solution is supported or not.

In NTN, it is necessary of the UE to report assistant information to the NW (which can be configured by NW or upon NW's request) to assist NW calculating the offset for SMTC/GAP configurations. FFS the detailed information.

The UE can be configured with multiple SMTCs per carrier. FFS if the UE can use only a partial set or all of them in parallel, and in case FFS whether based on network configuration or UE implementation.

(RAN2 #116-e)

Not introducing new mechanisms (e.g., based on MAC CE) to activate/deactivate SMTCs for NTN neighbor measurements. Which SMTCs the UE will consider is only based on RRC configuration (UE based solutions are not excluded by this).

RAN2 will decide which option to choose for NTN assistance information for SMTC/MG once SA3 feedback on user consent is received.

If propagation delay based UE assistance information for NTN SMTC is agreed, it is defined in the form of propagation delay difference.

RAN2 assumes FL delay is known to and compensated by the network. RAN2 also assumes the UE needs to have neighbor cell ephemeris for the propagation delay estimation.

In NW-based SMTC solution the UE is not allowed to apply shifts to configured SMTCs.

Measurement gap related aspects for Rel-17 NTN will be addressed in Rel-17 NTN WI. Coordination and avoiding overlap with other WIs and WGs is recommended.

RAN2 will reuse at least the SMTC agreements made for UE assistance information reporting also in the area of measurement gaps for NTN.

UE assistance information for NTN SMTC adjustments is event-triggered. Details of the triggering event are FFS (pending the decision on supported assistance information type).

RAN2 aims to minimize the number of configurable measurement gaps required for monitoring configured SMTCs in NTN. At least gap length and UE capabilities impact the number of required measurement gaps.

UE-based solution for SMTC adjustments in NTN is supported for IDLE/INACTIVE UEs. FFS how does the UE perform the necessary shifts in SMTC.

In NW-based solutions, the network can configure up to 2 SMTCs in parallel and the UE uses all of them, i.e. there is no switching between or activation/deactivation of configured SMTCs. FFS whether this (UE support for 2 SMTCs) requires a UE capability. A UE can optionally indicate support for 4 SMTCs (in this case the NW can configure up to 4 SMTCs in parallel).

Non-terrestrial networks (NTN) are to be introduced in New Radio (NR) to use an airborne/spaceborne vehicle as a platform for providing mobile services (e.g., [1] RP-201256). The User Equipment (UE) may link to, camp on, and/or connect to the NTN network that involves airborne/spaceborne for transmission. The NTN may comprise various platforms, including low earth orbit (LEO) satellite, medium earth orbit (MEO) satellite, highly elliptical orbit (HEO) satellite, geostationary earth orbit (GEO) satellite, geostationary synchronous Orbit (GSO) satellite, non-geostationary synchronous orbit (NGSO) satellite, and/or high altitude platform station (HAPS). A LEO satellite could have an earth-fixed beam (e.g., the beam is temporarily fixed on a location during a time period) or an earth-moving beam (e.g., the beam is continuously moving along with the satellite). The NTN could offer a wide-area coverage and provide network (NW) access in the scenario when terrestrial networks (TN) are unfeasible (e.g., desert, polar area, and/or on an airplane). More details regarding different NTN platforms can be found in TR 38.821 (e.g., [5] 3GPP TR 38.821 V16.0.0).

In NTN, a Cell Identity (ID) used on Uu System Information Block (SIB) content (and probably on Xn) would be decoupled from cell ID used on NG/N2 interface. And the NW is required to acquire the UE's location information to derive/map the Cell ID (e.g., [6] R2-2011041). In the 3GPP RAN2 meeting (e.g., [4] RP-211774), it has been agreed that the UE could report coarse location information during initial access in Msg5 (e.g., via RRCSetupComplete, RRCResumeComplete). The coarse location information would be coarse and/or truncated Global Navigation Satellite System (GNSS) coordinates. And after AS security is established, the UE could report (finer) GNSS-based location information using measurement report (e.g., in includeCommonLocationInfo (e.g., in [2] 3GPP TS 38.331 V16.5.0)). The UE could be configured by NW to provide UE location information (e.g., CommonLocationInfo (e.g., in [2] 3GPP TS 38.331 V16.5.0)) in Radio Resource Control connected state (RRC_CONNECTED_state) via (location) event triggered-based report and/or periodic (location) report. The User Consent would be needed for the UE to provide the UE location information (e.g., coarse location information, finer location information), which would be decided by 3GPP SA3.

For the measurement repot in RRC_CONNECTED, a UE could be configured by NW to measure multiple beams (at least one) of a cell to derive the cell quality. A UE could be configured by NW to measure the distance between the UE and a reference location (e.g., cell center, referenceLocation1, referenceLocation2 (e.g., in [3] R2-2111614)) of a NTN cell. The (NTN) cell may be a serving cell and/or a neighbor cell. The UE could be configured by the NW to initiate a measurement report based on event-triggering and/or a configured period. When a triggering event (e.g., criteria/condition for a triggering event) based on the measurement results is met, the UE would initiate a measurement reporting procedure to send the measurement results to the NW. When a triggering event (e.g., criteria/condition for a triggering event) is met, the UE would trigger a measurement report and/or initiate a measurement reporting procedure. When a triggering event (e.g., criteria/condition for a triggering event) is met, the UE would set a measurement report including measurement results. The triggering events may be that the radio condition of a serving cell and/or neighbor cell becomes better/worse than a threshold. The triggering events may be that the distance between the UE and (the reference point of) a serving cell and/or neighbor cell becomes larger/smaller than a threshold. The threshold may be an absolute threshold and/or an amount of offset. On the other hand, when a periodical reporting timer expires, the UE would initiate a measurement reporting procedure to send the measurement results to the NW. The details regarding measurement report could be found in TS 38.331 (e.g., [2] 3GPP TS 38.331 V16.5.0) and a NTN running CR for TS 38.331 (e.g., [3] R2-2111614).

Figure 6:
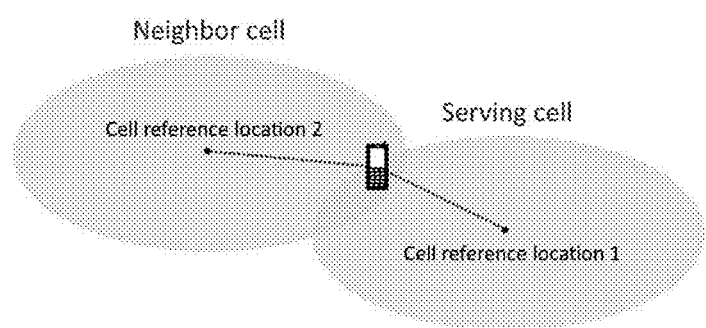
FIG. 6 illustrates an example of the concept of a location-based event, in accordance with embodiments of the present invention.

One or more location-based triggering events would be defined for NTN. When the event (e.g., entry condition of the event, and/or leaving condition of the event) is fulfilled, a measurement report could be triggered by the UE. The measurement report could include the latest measurement result(s) of the UE. As shown in FIG. 6, a location-based triggering event may be based on the distance between the UE and/or a first reference location (e.g., cell center) of a serving cell and the distance between the UE and a second reference location (e.g., cell center) of a neighbor cell.

A first location-based triggering event may be triggered by (or based on) the distance between the UE and a reference location (e.g., cell center) of a serving cell. For example, if the UE detects that the distance between the UE and the reference location of the serving cell becomes larger than a first threshold (e.g., provided in the configuration of the first location-based triggering event), the UE may consider the entering condition for this first event to be satisfied (for this serving cell). Alternatively and/or additionally, if the UE detects that the distance between the UE and the reference location of the serving cell becomes smaller than the first threshold, the UE may consider the leaving condition for this first event to be satisfied (for this serving cell).

A second location-based triggering event may be triggered by (or based on) the distance between the UE and a reference location (e.g., cell center) of a neighbor cell. For example, if the UE detects that the distance between the UE and the reference location of the neighbor cell becomes smaller than a second threshold (e.g., provided in the configuration of the second location-based triggering event), the UE may consider the entering condition for this second event to be satisfied (for the neighbor cell). Alternatively and/or additionally, if the UE detects that the distance between the UE and the reference location (e.g., cell center) of the neighbor cell becomes larger than the second threshold, the UE may consider the leaving condition for this second event to be satisfied (for the neighbor cell).

A third location-based triggering event may be triggered by (or based on) the distance between the UE and a reference location (e.g., cell center) of a serving cell and the distance between the UE and a reference location (e.g., cell center) of a neighbor cell. For example, if the UE detects that the distance between the UE and the reference location of the serving cell becomes larger than a first threshold (e.g., provided in configuration of the third location-based triggering event) and the distance between the UE and the reference location of the neighbor cell becomes smaller than a second threshold (e.g., provided in configuration of the third location-based triggering event), the UE may consider the entering condition for this third event to be satisfied. Alternatively and/or additionally, if the UE detects that the distance between the UE and the reference location of the serving cell becomes smaller than the first threshold and the distance between the UE and the reference location (e.g., cell center) of the neighbor cell becomes larger than the second threshold, the UE may consider the leaving condition for this third event to be satisfied.

When the entering condition and/or leaving condition for a location-based triggering event is satisfied, the UE may consider the location-based triggering event is fulfilled/triggered. When the entering condition and/or leaving condition for a location-based triggering event is satisfied, the UE may trigger a measurement report.

The reference location of a cell may be the geographic location of the cell. The reference location of a cell may be the cell center (e.g., on the ground). The reference location of a cell may be a virtual location defined by the network (e.g., the geographical area is split into rectangular grids and the reference location is represented by indices of the grid). The location-based triggering event(s) may be (triggered by and/or based on) at least one or more of the following conditions:

the distance between the UE and the reference location of the serving cell (or a neighbor cell) becomes below a threshold;
the distance between the UE and the reference location of the serving cell (or a neighbor cell) becomes above a threshold;
the distance between the UE and the reference location of a neighbor cell becomes the amount of offset below the distance between the UE and the reference location of the primary cell (PCell) (or primary serving cell (PS-Cell), or serving cell);
the distance between the UE and the reference location of a neighbor cell becomes below a threshold;
the distance between the UE and the reference location (e.g., referenceLocation1 (e.g., in [3] R2-2111614)) of the PCell (or PSCell, or serving cell) becomes above a threshold (e.g., Thresh1 (e.g., in [3] R2-2111614)) and the distance between the UE and the reference location (e.g., referenceLocation2 (e.g., in [3] R2-2111614)) of a neighbor cell and/or SCell becomes below another threshold (e.g., Thresh2 (e.g., in [3] R2-2111614)); and/or
the distance between the UE and the reference location of a neighbor cell becomes the amount of offset below the distance between the UE and the reference location of the secondary cell (SCell) (or serving cell).

On the other hand, several measurement events based on radio condition has been defined in current NR RRC (e.g., [2] 3GPP TS 38.331 V16.5.0). The radio condition-based triggering events could be (triggered by and/or based on) at least one or more of the following conditions:

Event A1: the radio condition of a serving cell becomes better than a threshold;
Event A2: the radio condition of a serving cell becomes worse than a threshold;
(Cond)Event A3: the radio condition of a neighbor cell becomes the amount of offset better than the PCell (or PSCell);
(Cond)Event A4: the radio condition of a neighbor cell becomes better than a threshold;
(Cond)Event A5: the radio condition of PCell (or PSCell, or serving cell) becomes worse than a threshold and the radio condition of a neighbor and/or SCell becomes better than another threshold; and/or
Event A6: the radio condition of a neighbor cell becomes the amount of offset better than the radio condition of a SCell;

A combination of one or more above measurement triggering events may be possible. A combination of different types of measurement triggering event may be possible. For example, a measurement event could be based on both the location information and the radio condition. For example, a measurement event could be defined by combining one of the legacy measurement events (e.g., event A1, A2, A3, A4, A5, and/or A6) and one of the location-based measurement events as described above. In this case, for example, the UE considers the entering condition to be satisfied when the entering conditions of the combined two events are both satisfied, and the UE considers the leaving condition to be satisfied when the leaving conditions of the combined two events are both satisfied.

For the purpose of UE location requirements (e.g., for the NW to derive Cell ID) in NTN, a UE needs to report its location information to the network in a NTN cell. The UE would be configured to report UE location information in RRC_CONNECTED state. The UE location information may be included in a RRC message (e.g., RRCSetupComplete, RRCResumeComplete, MeasurementReport). The UE may be configured to provide a UE location report to the network. The UE location report may be included in a measurement report. The measurement report (or UE location report) may be triggered based on an event and/or periodically. According to the current specification (e.g., NR RRC specification TS 38.331 (e.g., [2] 3GPP TS 38.331 V16.5.0)), a measurement report may include a variety of information in addition to the UE location (e.g., measurement result(s) of serving cell(s), measurement result(s) of neighbor cell(s), beam measurement result(s), best non-serving cell on a frequency, etc.). The information may be used to assist the NW for the handover decision (e.g., when to handover, which target cell to handover).

Figure 7:
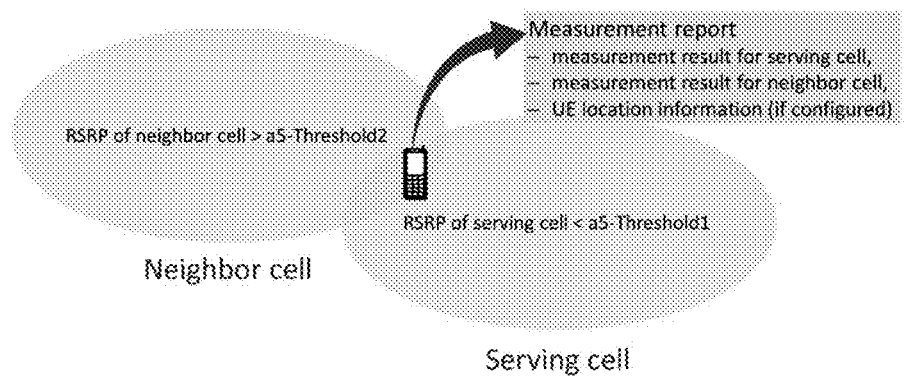
FIG. 7 illustrates an example for measurement reporting triggered by a radio condition-based event, in accordance with embodiments of the present invention.
Figure 8:
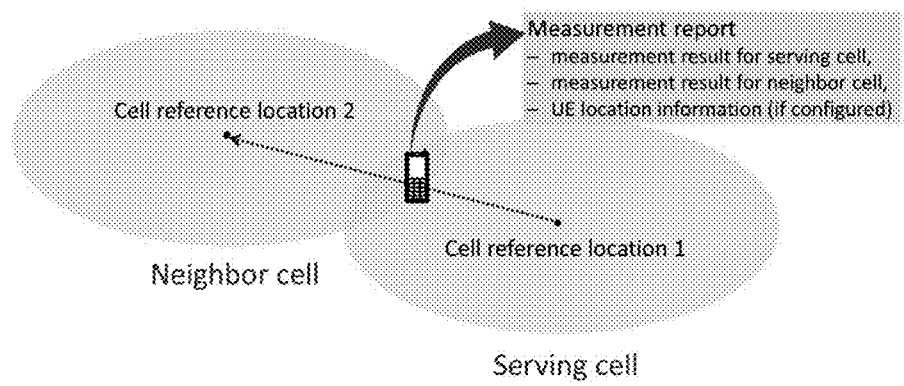
FIG. 8 illustrates an example for measurement reporting triggered by a location-based event, in accordance with embodiments of the present invention.

For example, as shown in FIG. 7, when a measurement report is triggered by a radio condition-based triggering event (e.g., Event A5) based on a serving cell and neighbor cell, the UE may transmit the measurement report including the measurement result for the serving cell and the measurement result for the neighbor cell triggering the condition-based triggering event. If the UE is configured to report UE location, the UE location information is included in the measurement report. Similarly, as shown in FIG. 8, when a measurement report is triggered by a location-based event based on the serving cell and neighbor cell, the UE may transmit the measurement report including measurement result for the serving cell, measurement result for the neighbor cell triggering the location-based event, and the UE location information. However, the location-based triggering event is used for NTN where a Reference Signal Received Power (RSRP) result may be less reliable, the RSRP measurement results for the serving cell and/or neighbor cell may be less useful in a measurement report triggered by the location-based event. When a measurement report is triggered (e.g., based on a triggering event and/or a periodical reporting timer as specified in TS 38.331 (e.g., [2] 3GPP TS 38.331 V16.5.0)) which may be for the purpose of location requirement, at least some information other than the UE location information in the measurement report may be less useful. For example, the measurement result(s) of neighbor cell(s) may not be useful, e.g., when the UE is not in the cell edge. For example, the measurement result(s) of serving cell quality may not differ too much in a NTN cell due to near-far effect as specified in TR 38.821 (e.g., [5] 3GPP TR 38.821 V16.0.0). Moreover, for a fast-moving UE, the UE may need to report the location information more frequently while at least some other information in the measurement report may be not changed (or not change too much). For the purpose of location reporting, if the UE reports whole measurement report with the configured information, signaling overhead may be significant. In addition, for a measurement report triggered by a location-based triggering event, the network could make handover decisions based on UE location information (if reported) or based on the measurement ID associated to the location-based event. Some methods to reduce the signaling overhead should be considered.

To solve the issue, the information included in a measurement report (or UE location report) could be different when the report is triggered for (the purpose of) location reporting and when the report is triggered for (the purpose of) cell/beam quality reporting. A measurement report (or UE location report) may be a report including a UE location. A first measurement report (or UE location report) may be triggered for location reporting. A second measurement report (or UE location report) may be triggered for cell/beam quality reporting.

A first information could be omitted (e.g., not provided, not included) in the first measurement report (or UE location report). The UE may omit (at least) one or more first information in the first measurement report (or UE location report). The UE may not provide and/or include (at least) one or more first information in the measurement report (or UE location report). The UE may provide and/or include (at least) one or more first information in the measurement report (or UE location report). A second information may be provided and/or included in the first measurement report (or UE location report). The UE may provide and/or include (at least) one or more second information in the first measurement report (or UE location report). The UE may provide and/or include one or more second information in a measurement report (or UE location report) and not provide and/or include one or more first information in the measurement report (or UE location report).

The first measurement report (or UE location report) and the second measurement report (or UE location report) may be differentiated based on a configuration. For example, the first measurement report may be triggered based on a first configuration. The second measurement report may be triggered based on a second configuration. The first configuration is different from the second configuration. The first configuration and/or the second configuration may be at least one of configurations specified in, e.g., periodic trigger, event trigger, location-based, measurement-based.

The first measurement report (or UE location report) and the second measurement report (or UE location report) may be differentiated based on a trigger of the report. For example, the first report may be triggered by a first trigger. The second report may be triggered by a second trigger. The first trigger is different from the second trigger. The first trigger and/or the second trigger may be at least one of triggers specified in the following (e.g., periodic trigger, event trigger, location-based, measurement-based).

The first measurement report (or UE location report) and the second measurement report (or UE location report) may be differentiated based on a cell type. The cell may be a serving cell of the UE. For example, the first report may be triggered when a serving cell of the UE is of a first type. The second report may be when a serving cell of the UE is of a second type. The first type is different from the second type. The first type and/or the second type may be at least one of the types specified in, e.g., a specific NW type, a specific NTN type.

The first measurement report (or UE location report) and the second measurement report (or UE location report) may be differentiated based on location of the UE. For example, the first report may be triggered when the UE is in a first location. The second report may be when the UE is in a second location. The first location is different from the second location. The first location and/or the second location may be at least one of the locations specified in, e.g., cell edge, cell center, distance from a reference location.

The first measurement report (or UE location report) may be triggered for the purpose of location reporting. The first measurement report (or UE location report) may be triggered based on a configuration for location report. The first measurement report (or UE location report) may be triggered by a location-based triggering event. The first measurement report (or UE location report) may be triggered based on a location-based triggering event. The first measurement report (or UE location report) may be triggered based on the period for UE location report. The first measurement report (or UE location report) may be triggered when a periodic timer (e.g., for UE location report) expires. The first measurement report (or UE location report) may be triggered when the serving cell is of a specific NTN type (e.g., LEO, MEO, HEO, GEO, GSO, NGSO, HAPS) and/or of a specific NW type (e.g., NTN, TN). The first measurement report (or UE location report) may be triggered when the UE is in cell center (e.g., distance from a reference location is not larger than a threshold).

For example, the UE may trigger a first measurement report when the distance between the UE and a reference location (e.g., referenceLocation1 (e.g., in [3] R2-2111614) of the serving cell becomes larger than a threshold (e.g., Thresh1 (e.g., in [3] R2-2111614)) and the distance between the UE and a reference location (e.g., referenceLocation2 (e.g., in [3] R2-2111614)) of a neighbor cell becomes shorter than another threshold (e.g., Thresh2 (e.g., in [3] R2-2111614)).

The first information may be a measurement result based on radio condition. The first information may be radio condition measurement result(s). The first information may be cell quality of a serving cell and/or neighbor cell(s). The first information may be measurement results of (radio condition of) a serving cell and/or a neighbor cell. The first information may be measurement results of (radio condition of) the cell (e.g., serving cell and/or neighbor cell) triggering a measurement report. The first information may be measurement results of (radio condition of) the cell (e.g., serving cell and/or neighbor cell) triggered/fulfilled triggering event. The first information may be measurement result(s) of beam measurement result(s) of one or more cells. The first information may be derived from SSB and/or Channel State Information Reference Signal (CSI-RS). The first information may be represented by RSRP, Reference Signal Received Quality (RSRQ) and/or Signal Interference plus Noise Ratio (SINR). The first information may be the best non-serving cell on a frequency. The first information may be a list of beams and/or cells.

The second information may be UE location information (e.g., CommonLocationInfo (e.g., in [2] 3GPP TS 38.331 V16.5.0)). The second information may be a measurement result based on UE location. The second information may be a measurement result based on the distance between the UE and a reference location. The second information may be location measurement result(s). The second information may be the distance between the UE and a serving cell and/or a neighbor cell. The second information may be a GNSS-based location information. The second information may be the GNSS coordinates of the UE. The second information may be a distance (e.g., in km) between the UE and a cell center. The second information may be a distance (e.g., in km) between the UE and the last reported UE location. The second information may be a Timing Advance (TA) value. The second information may be TA difference (from the last reported TA).

The first information may not be omitted (e.g., may be provided, and/or included) in a second measurement report. The second information may be and/or not be provided/included in the second measurement report. The UE may not omit the first information in the second measurement report. The UE may provide and/or include the first information in the second measurement report. The UE may provide and/or include the second information in the second measurement report. The UE may not provide and/or include the second information in the second measurement report.

The second measurement report may be triggered for the purpose of cell/beam quality reporting. The second measurement report may be triggered based on a configuration for radio condition report. The second measurement report may be triggered by a radio condition-based measurement event. The second measurement report (or UE location report) may be triggered based on a radio condition-based triggering event. The second measurement report may be triggered based on a period for radio condition report. The second measurement report may be triggered when a periodic timer (e.g., for radio condition report) expires. The second measurement report (or UE location report) may be triggered when the UE is in cell edge (e.g., distance from a reference location is larger than a threshold).

In one example, the UE may receive a first configuration to trigger measurement reporting based on a first event (e.g. location-based triggering event (e.g., eventD1)). The UE may receive a second configuration to trigger measurement reporting based on a second event (e.g., radio condition-based triggering event (e.g., eventA5)). The first event (e.g., location-based triggering event) may be triggered/fulfilled when the distance between the UE and a first reference location of a serving cell (e.g., referenceLocation1) becomes larger than a distance threshold and the distance between the UE and a second reference location of a first neighbor cell (e.g., referenceLocation2) becomes shorter than another distance threshold. The first neighbor cell may be a (candidate) target cell of the first event (e.g., location-based triggering event (e.g., eventD1)). The second event (e.g., radio condition-based triggering event) may be triggered/fulfilled when the measurement results (of radio condition) of the serving cell (or PCell) becomes worse than a RSRP threshold and the measurement results (of radio condition) of a second neighbor cell becomes better than another RSRP threshold. The first neighbor cell and the second neighbor cell may be different neighbor cells. The first neighbor cell and the second neighbor cell may be same neighbor cell. The first neighbor cell and the second neighbor cell may be a cell neighboring to the serving cell.

Figure 9:
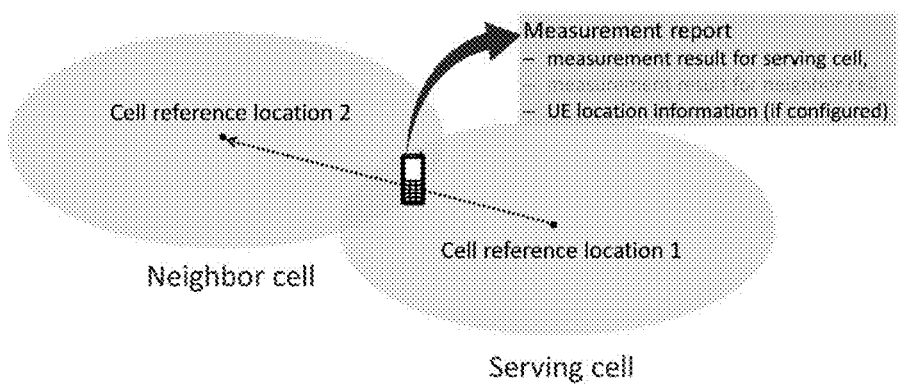
FIG. 9 illustrates an example for a UE triggering a first measurement report based on the location-based triggering event, in accordance with embodiments of the present invention.

As shown in FIG. 9, the UE may trigger a first measurement report based on the first event (e.g., location-based triggering event (e.g., eventD1)). The UE may trigger a first measurement report when the distance between the UE and the first reference location of the serving cell (e.g., referenceLocation1) becomes larger than the distance threshold and the distance between the UE and the second reference location of the first neighbor cell (e.g., referenceLocation2) becomes shorter than the another distance threshold. The UE may not include measured radio condition of the first neighbor cell in the first measurement report. The measured radio condition of the first neighbor cell may be omitted or not included in the first measurement report. The UE may include measured radio condition of the serving cell in the first measurement report. The measured radio condition of the serving cell may be not omitted or be included in the first measurement report. The UE may include a (coarse) location information (of the UE) in the first measurement report, e.g., if configured by the network. The (coarse) location information (of the UE) may be included in the first measurement report, e.g., if configured by the network. The UE may not include the (coarse) location information (of the UE) in the first measurement report, e.g., if not configured by the network. The (coarse) location information (of the UE) may be not included in the first measurement report, e.g., if not configured by the network. The UE may transmit the first measurement report to the network.

The UE may trigger a second measurement report based on the second event (e.g., radio condition-based triggering event (e.g., eventA5)). The UE may trigger a second measurement report when the measurement results (of radio condition) of the serving cell (or PCell) becomes worse than the RSRP threshold and the measurement results (of radio condition) of the second neighbor cell becomes better than the another RSRP threshold. The UE may include measured radio condition of the second neighbor cell in the second measurement report. The measured radio condition of the second neighbor cell may be not omitted or be included in the second measurement report. The UE may include measured radio condition of the serving cell in the second measurement report. The measured radio condition of the serving cell may be not omitted or be included in the second measurement report. The UE may include a (coarse) location information (of the UE) in the second measurement report, e.g., if configured by the network. The (coarse) location information (of the UE) may be included in the second measurement report, e.g., if configured by the network. The UE may not include the (coarse) location information (of the UE) in the second measurement report, e.g., if not configured by the network. The (coarse) location information (of the UE) may be not included in the second measurement report, e.g., if not configured by the network. The UE may transmit the second measurement report to the network.

The UE may omit (at least) one or more first information in the first measurement report (or UE location report) if the content of the one or more first information is the same as the content reported last time. The UE may omit (at least) one or more first information in the first measurement report (or UE location report) if the content of the one or more of first information is not above a threshold. The UE may omit (at least) one or more first information in the first measurement report (or UE location report) if a timer (e.g., periodic timer) is not running. The UE may omit (at least) one or more first information in the first measurement report (or UE location report) if receiving a NW indication.

Throughout the disclosure, one, some, and/or all instances of "below a threshold" may correspond to, may be supplemented with, and/or may be replaced by "shorter than a threshold" and/or "smaller than a threshold". Throughout the disclosure, one, some, and/or all instances of "above a threshold" may correspond to, may be supplemented with, and/or may be replaced by "longer than a threshold" and/or "larger than a threshold".

Throughout the disclosure, one, some, and/or all instances of "triggering event" may correspond to, may be supplemented with, and/or may be replaced by "event", "measurement event", "measurement triggering event" and/or "measurement report triggering event". The triggering event may be an event to trigger measurement report.

Throughout the disclosure, one, some, and/or all instances of "(UE) location information" may correspond to, may be supplemented with, and/or may be replaced by "UE location". The UE location information may be a coarse and/or a finer location information. The UE location information may be a GNSS-based location information. The UE location information may be GNSS coordinate(s) and/or part of GNSS coordinate(s). The UE location information may be locationInfo, commonLocationInfo and/or locationCoordinate as specified in TS 38.331 (e.g., [2] 3GPP TS 38.331 V16.5.0).

The cell quality may be the radio condition and/or signaling strength of a cell, measured/derived by the UE. The cell quality and/or radio condition of a cell/beam may be with respect to SSB and/or CSI-RS. The cell quality and/or radio condition of a cell/beam may be represented by RSRP, RSRQ, and/or SINR.

The UE may receive one or more measurement reporting configurations (e.g., MeasConfig, ReportConfigNR) comprising a triggering event (e.g., eventA1, eventA2, eventA3, eventA4, eventA5, eventD1) and/or an interval (e.g., ReportInterval) of a periodic timer, for location report and/or radio condition report. The UE may receive configurations related to location-based and/or radio condition-based measurement (report).

The UE may be in a cell of a NTN. The UE may be connected to a cell of a NTN. The UE may be connected to a LEO, GEO, MEO, HEO, and/or HAPS. Throughout the disclosure, a cell may be, may refer to a NTN cell.

The UE may be referred to as the UE or a RRC entity of the UE.

The UE may be a NR device. The UE may be a NR-light device. The UE may be a reduced capability device. The UE may be a mobile phone. The UE may be a wearable device. The UE may be a sensor. The UE may be a stationary device.

The network may be a network node. The network may be a base station. The network may be an access point. The network may be an eNB. The network may be a gNB. The network may be a gateway.

Figure 10:
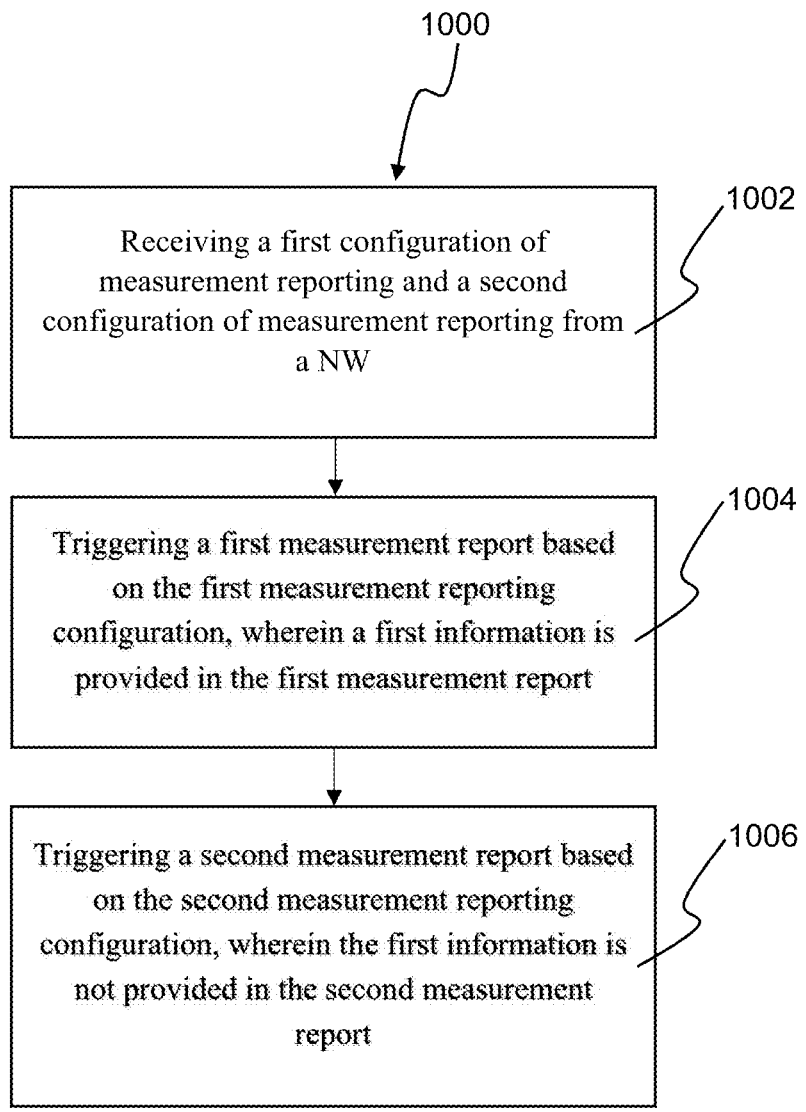
FIG. 10 is a flow diagram of a method of a UE receiving a first configuration of measurement reporting and a second configuration of measurement reporting from a NW, in accordance with embodiments of the present invention.

Referring to FIG. 10, with this and other concepts, systems, and methods of the present invention, a method 1000 for a UE in a wireless communication system comprises receiving a first configuration of measurement reporting and a second configuration of measurement reporting from a NW (step 1002), triggering a first measurement report based on the first measurement reporting configuration, wherein a first information is provided in the first measurement report (step 1004), and triggering a second measurement report based on the second measurement reporting configuration, wherein the first information is not provided in the second measurement report (step 1006).

In various embodiments, the first information may be one or more measurement results based on radio condition.

In various embodiments, the first measurement report is triggered for (the purpose of) cell/beam quality reporting.

In various embodiments, the second measurement report is triggered for (the purpose of) location reporting.

In various embodiments, the method further comprises providing a second information in the second measurement report, wherein the second information is provided or not provided in the first measurement report.

In various embodiments, the second information may be one or more measurement results based on UE location.

In various embodiments, the second information may be UE location information.

Referring back to FIGS. 3 and 4, in one or more embodiments from the perspective of a UE, the device 300 includes a program code 312 stored in memory 310 of the transmitter. The CPU 308 could execute program code 312 to: (i) receive a first configuration of measurement reporting and a second configuration of measurement reporting from a NW; (ii) trigger a first measurement report based on the first measurement reporting configuration, wherein a first information is provided in the first measurement report; and (iii) trigger a second measurement report based on the second measurement reporting configuration, wherein the first information is not provided in the second measurement report. Moreover, the CPU 308 can execute the program code 312 to perform all of the described actions, steps, and methods described above, below, or otherwise herein.

Referring again back to FIGS. 3 and 4, in one or more embodiments from the perspective of a NW, the device 300 includes a program code 312 stored in memory 310 of the transmitter. The CPU 308 could execute program code 312 to: (i) transmit a first configuration of measurement reporting and a second configuration of measurement reporting to a UE; (ii) receive, from the UE, a first measurement report triggered based on the first measurement reporting configuration, wherein a first information is provided in the first measurement report; and (iii) receive, from the UE, a second measurement report triggered based on the second measurement reporting configuration, wherein the first information is not provided in the second measurement report. Moreover, the CPU 308 can execute the program code 312 to perform all of the described actions, steps, and methods described above, below, or otherwise herein.

Information about UE TA could be reported by the UE to the NW in NTN. If enabled by the NW, the information about UE TA could be reported during/at a Random Access (RA) procedure (e.g., in MSGA/Msg3 or Msg5) using Medium Access Control (MAC) Control Element (CE). The information about UE TA could be reported in initial access and/or in RRC connected mode. The TA reporting during/at RA procedure would be enabled/disabled by system information. The TA reporting during/at RA procedure may be controlled by a parameter (e.g., enableTA-Report) included in a system information. And the TA reporting in RRC connected mode is event-triggered (e.g., configured by NW). The reporting event would be based on a TA offset threshold between current information about UE TA and the last successfully reported information about UE TA. For example, if the TA value of the UE change above the TA offset threshold (e.g., the difference between current TA and the last successfully reported TA is above an offset) in RRC connected mode, the UE would trigger the TA reporting. In addition, dedicated signaling (e.g., RRC configuration) is used to configure the UE to report UE location information and/or TA related information for the purpose of TA reporting in RRC connected mode.

For example, the UE may report the information related to UE-specific TA during/at RA procedure (e.g., in initial access) using a MAC CE, if the reporting is enabled by system information (e.g., enableTA-Report in a system information is set to enabled, enableTA-Report is present in a system information). The UE may not report the information related to UE-specific TA during/at RA procedure (e.g., in initial access), if the reporting is disabled by system information (e.g., enableTA-Report in a system information is not set to enabled, enableTA-Report is absent in a system information).

The UE may report the information related to UE-specific TA in RRC connected mode if configured by dedicated signaling and (at least) a reporting event is fulfilled/triggered. The UE may be configured to report the information related to UE-specific TA with content as TA related information and/or UE location information in RRC connected mode. The UE may be configured to report the information related to UE-specific TA with content as TA related information using MAC CE in RRC connected mode. The UE may be configured to report the information related to UE-specific TA with content as UE location information using RRC signaling in RRC connected mode. The TA reporting in RRC connected mode may be enabled/disabled by system information. The TA reporting in RRC connected mode may not be enabled/disabled by system information. The UE may report the information related to UE-specific TA during/at RA procedure (e.g., for RRC reconfiguration with sync and/or handover) in RRC connected mode using MAC CE, if the reporting is enabled by system information (e.g., included in Handover (HO) command message). The UE may not report the information related to UE-specific TA during RA procedure (e.g., for RRC reconfiguration with sync and/or handover) in RRC connected mode, if the reporting is disabled by system information (e.g., included in HO command message).

Assistance information for SSB-based Measurement Timing Configuration (SMTC) (and/or measurement gap) configuration could be reported by a UE to a NW in NTN. The report of the assistance information for SMTC (and/or measurement gap) configuration may be configured by the NW, e.g., via a dedicated signaling, via RRC signaling, via RRC reconfiguration. The report of the assistance information for SMTC (and/or measurement gap) configuration may be event-triggered. The event to trigger the report may be based on how far the UE has moved (e.g., distance between the current UE location and the last reported UE location, distance between the current UE location and the UE location where the last report is made). For example, if the UE has moved a distance above a configured threshold (e.g., the difference between the current UE location and the last reported UE location is above the configured threshold), the UE may trigger the report.

The UE may receive a configuration of the report of the assistance information for SMTC (and/or measurement gap) configuration. The configuration may configure the UE to trigger the report, e.g., periodically, and/or event triggered. If (or in response to) a report being triggered, the UE includes the assistance information for SMTC (and/or measurement gap) configuration in the report.

The assistance information for SMTC (and/or measurement gap) configuration may assist the NW to configure a (proper) SMTC (and/or measurement gap) configuration for the UE. The NW may derive (or calculate) the propagation delay difference for the UE between a serving cell and a neighbor cell (e.g., the difference of the propagation delay from a serving cell to the UE and the propagation delay from a neighbor cell to the UE) based on the assistance information. The NW may use ephemeris of the serving cell and/or the neighbor cell for the derivation.

The assistance information for SMTC (and/or measurement gap) configuration may be related to UE location. For example, the assistance information may be UE location. The assistance information may be coarse UE location. The assistance information may be fine UE location.

The assistance information for SMTC (and/or measurement gap) configuration may be related to propagation delay. For example, the assistance information may be propagation delay difference. The assistance information may be propagation delay.

The propagation delay difference may be between a serving cell to the UE (or the UE to a serving cell) and at least a neighbor cell to the UE (or the UE to at least a neighbor cell).

The propagation delay may be from a serving cell to the UE (or from the UE to a serving cell). The propagation delay may be from a neighbor cell to the UE (or from the UE to a neighbor cell).

Due to various reasons (e.g., location requirement for the NW to derive Cell ID, UE-specific TA change, SMTC and/or measurement gap configuration), the UE could be configured to provide some assistance information to the NW, e.g., when the UE is in RRC connected state. The assistance information may include UE location-related information, TA-related information, SMTC-related information. The assistance information may be included in a UE assistance information report and/or a UE location report. The report may be transmitted via a RRC message), e.g., RRC Setup Complete message, RRC Resume Complete message, Measurement Report, UE Assistance Information. The UE assistance information report and/or a UE location report may be triggered based on an event and/or periodically.

The UE assistance information report (and/or the UE location report) may serve more than one purpose. Taking measurement report as an example, a measurement report (e.g., as specified in NR RRC specification TS 38.331 (e.g., [2] 3GPP TS 38.331 V16.5.0)) may include a variety of information in addition to UE location (e.g., measurement result(s) of serving cell(s), measurement result(s) of neighbor cell(s), beam measurement result(s), best non-serving cell on a frequency, etc.). The information may be used to assist the NW for handover decisions (e.g., when to handover, which target cell to handover). When a measurement report is triggered (e.g., based on a triggering event and/or a periodical reporting timer as specified in TS 38.331 (e.g., [2] 3GPP TS 38.331 V16.5.0)) for at least some purposes mentioned above (e.g., location requirement for NW to derive Cell ID, UE-specific TA change, SMTC and/or measurement gap configuration), at least some information other than UE location information in the measurement report may be less useful.

For example, the measurement result(s) of neighbor cell(s) may not be useful when the UE is not in the cell edge. For example, the measurement result(s) of serving cell quality may not differ too much in a NTN cell due to near-far effect as specified in TR 38.821 (e.g., [5] 3GPP TR 38.821 V16.0.0). Moreover, for a fast-moving UE, the UE may need to report the location information more frequently while at least some other information in the measurement report may be not changed (or not change too much). In such case(s), if the UE reports whole measurement report with the configured information, signaling overhead may be significant. Some methods to reduce the signaling overhead should be considered.

In addition, the same assistance information (e.g., UE location) may be configured to be reported based on different triggers (e.g., based on UE moving distance, based on UE-specific TA change, based on location-based triggering event). The report may be transmitted via the same RRC message (e.g., measurement report). For the same UE assistance information report triggered by different causes, the content of the UE assistance information report may not necessarily be the same. Some (additional) information may be useful for some trigger but not useful for some other trigger. Moreover, some information may be needed to differentiate the triggers. What information should be included in a UE assistance information report should be considered carefully in order to not induce unnecessary signaling overhead.

To solve the issue, the content of a UE assistance information report could be different from each other, e.g., based on its trigger. Information included in a first UE assistance information report could be different from information included in a second UE assistance information report.

The UE assistance information report may be a UE location report, a measurement report, and/or a TA report. The UE assistance information report may be a UE assistance information message, a measurement report message, and/or a RRC message including UE location information. The measurement report may be triggered based on a location-based triggering event and/or a radio condition-based triggering event.

A first information may be omitted (e.g., not provided, not included) in the first UE assistance information report. The UE may omit (at least) one or more first information in the first UE assistance information report. The UE may not provide and/or include (at least) one or more first information in the first UE assistance information report. A second information may be provided and/or included in the first UE assistance information report. The UE may provide and/or include (at least) one or more second information in the first UE assistance information report.

The first information may not be omitted (e.g., may be provided, and/or included) in a second UE assistance information report. The second information may be and/or not be provided/included in the second UE assistance information report. The UE may not omit the first information in the second UE assistance information report. The UE may provide and/or include the first information in the second UE assistance information report. The UE may provide and/or include the second information in the second UE assistance information report. The UE may not provide and/or include the second information in the second UE assistance information report.

The UE may omit (at least) one or more first information in the first UE assistance information report if the content of the one or more first information is the same as the content reported last time. The UE may omit (at least) one or more first information in the first UE assistance information report if the value of the one or more first information does not change above a threshold. The UE may omit (at least) one or more first information in the first UE assistance information report if a timer (e.g., periodic timer) is not running. The UE may omit (at least) one or more first information in the first UE assistance information report if receiving a NW indication.

The first UE assistance information report and the second UE assistance information report may be differentiated based on a purpose of the report. For example, the first UE assistance information report may be for a first purpose. The second UE assistance information report may be for a second purpose. The first purpose is different from the second purpose. The first purpose and/or the second purpose may be at least one of purposes specified in the following:

location update;
TA update;
(request of) SMTC (re)configuration;
(request of) measurement gap (re)configuration; and/or
cell/beam quality reporting.

The first UE assistance information report and the second UE assistance information report may be differentiated based on a condition (or trigger) to trigger the report. For example, the first UE assistance information report may be triggered by a first trigger. The second UE assistance information report may be triggered by a second trigger. The first trigger is different from the second trigger. The first trigger and/or the second trigger may be at least one of the triggers specified in the following:

periodic trigger, e.g., upon a timer expiry;
location-based event, e.g., based on distance between UE location and a reference location (of a serving cell and/or a neighbor cell);
location-based event combined with measurement-based event;
measurement-based event solely, e.g., serving and/or neighbor cell measurement result better/lower than a threshold;
requested by NW, e.g., via a system information, via a dedicated signaling;
TA value change over a threshold;
UE moving distance (or UE location change) over a threshold;
propagation delay difference change over a threshold; and/or
difference between NW configuration and UE measurement over a threshold.

The first UE assistance information report and the second UE assistance information report may be differentiated based on a message to transmit the report. For example, the first UE assistance information report may be transmitted using a first message. The second UE assistance information report may be transmitted using a second message. The first message is different from the second message. The first message and/or the second message may be at least one of the messages specified in the following:

measurement report;
UE assistance information;
UE information response;
RRC setup complete;
RRC resume complete;
RRC reconfiguration complete; and/or
RRC re-establishment complete.

The first UE assistance information report and the second UE assistance information report may be differentiated based on a configuration. For example, the first UE assistance information report may be triggered based on a first configuration. The second UE assistance information report may be triggered based on a second configuration. The first configuration is different from the second configuration. The first configuration and/or the second configuration may be at least one of the configurations specified in the following:

measurement report related configuration, e.g., report-ConfigNR;

measurement-based event configuration (e.g., eventA1, eventA2, eventA3, eventA4, eventA5, eventD1);

location-based event configuration;

TA-related configuration;

system information, e.g., enableTA-report;

SMTC-related configuration; and/or measurement gap-related configuration.

The first UE assistance information report and the second UE assistance information report may be differentiated based on a cell type. The cell may be a serving cell of the UE. For example, the first UE assistance information report may be triggered when a serving cell of the UE is of a first type. The second report may be when a serving cell of the UE is of a second type. The first type is different from the second type. The first type and/or the second type may be at least one of the types specified in the following NW type of a cell, e.g., TN, NTN;

NTN type of a cell, e.g., LEO, MEO, HEO, GEO, GSO, NGSO, HAPS;

Radio Access Technology (RAT) type of a cell, e.g., NR, Evolved Universal Terrestrial Radio Access (E-UTRA); and/or indicated by a cell list, e.g., white list, black list, allowed cell list.

The first UE assistance information report and the second UE assistance information report may be differentiated based on location of the UE. For example, the first UE assistance information report may be triggered when the UE is in a first location. The second UE assistance information report may be when the UE is in a second location. The first location is different from the second location. The first location and/or the second location may be at least one of the locations specified in the following:

UE location with respect to a cell, e.g., cell edge, cell center;

UE location with respect to a reference location, e.g., distance from a reference location;

UE location with respect to last reported UE location, e.g., distance from a last reported location; and/or UE location indicated/configured by NW.

More than one differentiation mentioned above may be used jointly to differentiate the first UE assistance information report and the second UE assistance information report.

The first information may be a radio measurement-related information. The second information may be a radio measurement-related information. The radio measurement-related information may be one or more of the following:

measurement result based on radio condition;

radio condition measurement result(s);

cell quality and/or measurement result(s) of a serving cell and/or neighbor cell(s);

measurement result(s) of beam measurement result(s) of one or more cell;

derived from SSB and/or CSI-RS;

represented by RSRP, RSRQ and/or SINR;

best non-serving cell on a frequency; and/or a list of beams and/or cells.

The first information may be a UE location-related information. The second information may be a UE location-related information. The UE location-related information may be one or more of the following:

UE location information (e.g., CommonLocationInfo (e.g., in [2] 3GPP TS 38.331 V16.5.0);

measurement result based on UE location;

measurement result based on the distance between the UE and a reference location;

location measurement result(s);

distance between the UE and a serving cell and/or neighbor cell;

GNSS-based location information (e.g., truncated GNSS coordinates of the UE);

GNSS coordinates of the UE;

distance (e.g., in km) between the UE and a cell center; and/or distance (e.g., in km) between the UE and the last reported UE location.

The first information may be a TA-related information. The second information may be a TA-related information. The TA-related information may be one or more of the following:

TA value, e.g., full TA, UE-specific TA, service link TA;

TA difference, e.g., from the last reported TA;

difference between full TA and the cell-specific K offset;

a component or combination of the components in the UE's TA formula as specified in [7] R2-2111221 (i.e., $T_{TA}=(N_{TA}+N_{TA,UE-specific}+N_{TA,common}+N_{TA,offset})\times T_c$) and a K offset;

UE location information (e.g., CommonLocationInfo (e.g., in [2] 3GPP TS 38.331 V16.5.0));

GNSS-based location information (e.g., truncated GNSS coordinates of the UE); and/or GNSS coordinates of the UE.

The first information may be a SMTC-related information. The second information may be a SMTC-related information. The SMTC-related information may be one or more of the following:

propagation delay;

propagation delay difference, e.g., between serving cell and neighbor cells;

UE location information (e.g., CommonLocationInfo (e.g., in [2] 3GPP TS 38.331 V16.5.0));

GNSS-based location information (e.g., truncated GNSS coordinates of the UE); and/or GNSS coordinates of the UE.

The first information and/or the second information may be one or more of the following:

cause, e.g., location update, Location Services (LCS), TA report, SMTC configuration;

trigger, e.g., periodic, requested by NW, location-based event, measurement-based event; and/or indication of a SMTC configuration, e.g., identity of SMTC configuration, which SMTC configuration should be reconfigured.

Figure 11:
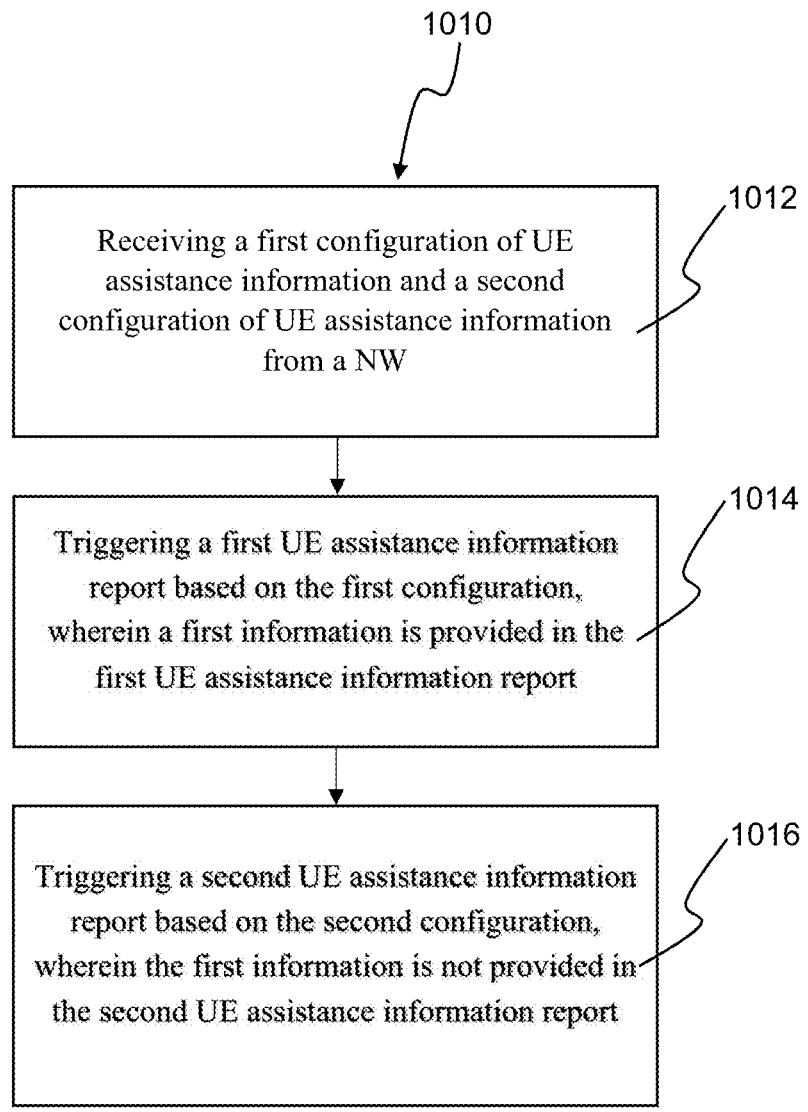
FIG. 11 is a flow diagram of a method of a UE receiving a first configuration of UE assistance information and a second configuration of UE assistance information from a NW, in accordance with embodiments of the present invention.

Referring to FIG. 11, with this and other concepts, systems, and methods of the present invention, a method 1010 for a UE in a wireless communication system comprises receiving a first configuration of UE assistance information and a second configuration of UE assistance information from a NW (step 1012), triggering a first UE assistance information report based on the first configuration, wherein a first information is provided in the first UE assistance information report (step 1014), and triggering a second UE assistance information report based on the second configuration, wherein the first information is not provided in the second UE assistance information report (step 1016).

In various embodiments, the method further comprises providing a second information in the second UE assistance information report, wherein the second information is provided or not provided in the first UE assistance information report.

In various embodiments, the first information may be one or more measurement results based on radio condition.

In various embodiments, the first UE assistance information report is triggered for (the purpose of) cell/beam quality reporting.

In various embodiments, the second UE assistance information report is triggered for (the purpose of) location reporting.

In various embodiments, the second UE assistance information report is triggered for (the purpose of) TA reporting.

In various embodiments, the second UE assistance information report is triggered for (the purpose of) SMTC (re)configuration.

In various embodiments, the second information may be one or more measurement result based on UE location.

In various embodiments, the second information may be UE location information.

Referring back to FIGS. 3 and 4, in one or more embodiments from the perspective of a UE, the device 300 includes a program code 312 stored in memory 310 of the transmitter. The CPU 308 could execute program code 312 to: (i) receive a first configuration of UE assistance information and a second configuration of UE assistance information from a NW; (ii) trigger a first UE assistance information report based on the first configuration, wherein a first information is provided in the first UE assistance information report; and (iii) trigger a second UE assistance information report based on the second configuration, wherein the first information is not provided in the second UE assistance information report. Moreover, the CPU 308 can execute the program code 312 to perform all of the described actions, steps, and methods described above, below, or otherwise herein.

Referring again back to FIGS. 3 and 4, in one or more embodiments from the perspective of a NW, the device 300 includes a program code 312 stored in memory 310 of the transmitter. The CPU 308 could execute program code 312 to: (i) transmit a first configuration of UE assistance information and a second configuration of UE assistance information; (ii) receive, from the UE, a first UE assistance information report triggered based on the first configuration, wherein a first information is provided in the first UE assistance information report; and (iii) receive, from the UE, a second UE assistance information report triggered based on the second configuration, wherein the first information is not provided in the second UE assistance information report. Moreover, the CPU 308 can execute the program code 312 to perform all of the described actions, steps, and methods described above, below, or otherwise herein.

Figure 12:
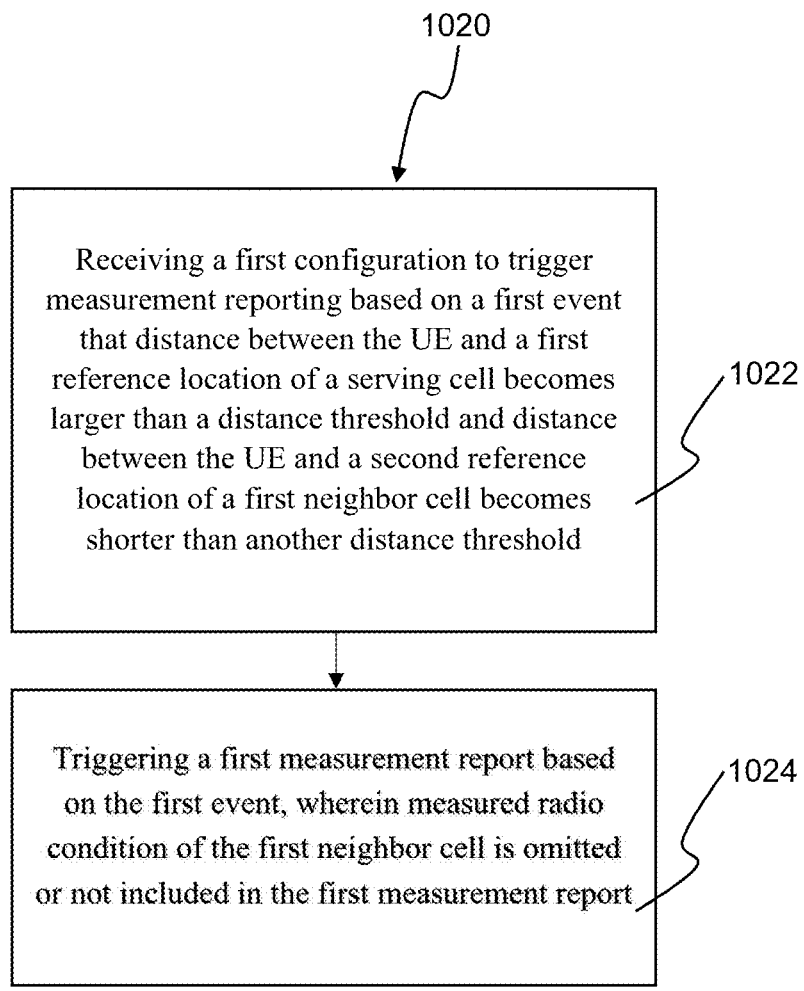
FIG. 12 is a flow diagram of a method of a UE receiving a first configuration to trigger measurement reporting based on a first event, in accordance with embodiments of the present invention.

Referring to FIG. 12, with this and other concepts, systems, and methods of the present invention, a method 1020 for a UE in a wireless communication system comprises receiving a first configuration to trigger measurement reporting based on a first event that distance between the UE and a first reference location of a serving cell becomes larger than a distance threshold and distance between the UE and a second reference location of a first neighbor cell becomes shorter than another distance threshold (step 1022), and triggering a first measurement report based on the first event, wherein measured radio condition of the first neighbor cell is omitted or not included in the first measurement report (step 1024).

In various embodiments, the first event is a location-based triggering event.

In various embodiments, the method further comprises including a (coarse) location information in the first measurement report.

In various embodiments, the first reference location of the serving cell is referenceLocation1 and the second reference location of the first neighbor cell is referenceLocation2.

In various embodiments, the method further comprises receiving a second configuration to trigger measurement reporting based on a second event that measurement result (of radio condition) of a serving cell (or PCell) becomes worse than a Reference Signal Received Power (RSRP) threshold and measurement result (of radio condition) of a second neighbor cell becomes better than another RSRP threshold; and triggering a second measurement report based on the second event, wherein measured radio condition of the serving cell and/or the second neighbor cell is included or not omitted in the second measurement report.

In various embodiments, the second event is a radio condition based triggering event.

In various embodiments, the first neighbor cell and the second neighbor cell are the same cell.

In various embodiments, the UE determines to include measured radio condition of a neighbor cell based on triggering of the measurement report.

In various embodiments, the first measurement report and the second measurement report are differentiated based on triggering of the measurement report.

In various embodiments, the method further comprises determining to not include measured radio condition of a neighbor cell in a measurement report, wherein the measurement report is triggered by a location-based triggering event associated with the neighbor cell.

In various embodiments, the method further comprises transmitting the first measurement report and/or the second measurement report to a network.

In various embodiments, measured radio condition of the first neighbor cell is not included and measured radio condition of the serving cell is included in the first measurement report.

Referring back to FIGS. 3 and 4, in one or more embodiments from the perspective of a UE, the device 300 includes a program code 312 stored in memory 310 of the transmitter. The CPU 308 could execute program code 312 to: (i) receive a first configuration to trigger measurement reporting based on a first event that distance between the UE and a first reference location of a serving cell becomes larger than a distance threshold and distance between the UE and a second reference location of a first neighbor cell becomes shorter than another distance threshold; and (ii) trigger a first measurement report based on the first event, wherein measured radio condition of the first neighbor cell is omitted or not included in the first measurement report. Moreover, the CPU 308 can execute the program code 312 to perform all of the described actions, steps, and methods described above, below, or otherwise herein.

Referring again back to FIGS. 3 and 4, in one or more embodiments from the perspective of a NW, the device 300 includes a program code 312 stored in memory 310 of the transmitter. The CPU 308 could execute program code 312 to: (i) transmit a first configuration to trigger measurement reporting based on a first event that distance between a UE and a first reference location of a serving cell becomes larger than a distance threshold and distance between the UE and a second reference location of a first neighbor cell becomes shorter than another distance threshold; and (ii) receive, from the UE, a first measurement report triggered based on the first event, wherein measured radio condition of the first neighbor cell is omitted or not included in the first measurement report. Moreover, the CPU 308 can execute the program code 312 to perform all of the described actions, steps, and methods described above, below, or otherwise herein.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a User Equipment (UE), comprising:
receiving a first configuration to trigger measurement reporting based on a first event that distance between the UE and a first reference location of a serving cell becomes larger than a distance threshold and distance between the UE and a second reference location of a first neighbor cell becomes shorter than another distance threshold; and
triggering a first measurement report based on the first event, wherein measured radio condition of the first neighbor cell is omitted or not included in the first measurement report.

2. The method of claim 1, further comprising including a location information in the first measurement report.

3. The method of claim 1, wherein the first reference location of the serving cell is referenceLocation1 and the second reference location of the first neighbor cell is referenceLocation2.

4. The method of claim 1, further comprising:
receiving a second configuration to trigger measurement reporting based on a second event that measurement result of a serving cell becomes worse than a Reference Signal Received Power (RSRP) threshold and measurement result of a second neighbor cell becomes better than another RSRP threshold; and
triggering a second measurement report based on the second event, wherein measured radio condition of the serving cell and/or the second neighbor cell is included or not omitted in the second measurement report.

5. The method of claim 4, wherein the first neighbor cell and the second neighbor cell are the same cell.

6. The method of claim 4, wherein the UE determines to include measured radio condition of a neighbor cell based on triggering of the measurement report.

7. The method of claim 4, wherein the first measurement report and the second measurement report are differentiated based on triggering of the measurement report.

8. The method of claim 1, further comprising determining to not include measured radio condition of a neighbor cell in a measurement report, wherein the measurement report is triggered by a location-based triggering event associated with the neighbor cell.

9. The method of claim 1, further comprising transmitting the first measurement report and/or the second measurement report to a network.

10. The method of claim 1, wherein measured radio condition of the first neighbor cell is not included and measured radio condition of the serving cell is included in the first measurement report.

11. A User Equipment (UE), comprising:
a memory; and
a processor operatively coupled to the memory, wherein the processor is configured to execute program code to:
receive a first configuration to trigger measurement reporting based on a first event that distance between the UE and a first reference location of a serving cell becomes larger than a distance threshold and distance between the UE and a second reference location of a first neighbor cell becomes shorter than another distance threshold; and
trigger a first measurement report based on the first event, wherein measured radio condition of the first neighbor cell is omitted or not included in the first measurement report.

12. The UE of claim 11, wherein the processor is further configured to execute program code to include a location information in the first measurement report.

13. The UE of claim 11, wherein the first reference location of the serving cell is referenceLocation1 and the second reference location of the first neighbor cell is referenceLocation2.

14. The method of claim 11, wherein the processor is further configured to execute program code to:
receive a second configuration to trigger measurement reporting based on a second event that measurement result of a serving cell becomes worse than a Reference Signal Received Power (RSRP) threshold and measurement result of a second neighbor cell becomes better than another RSRP threshold; and
trigger a second measurement report based on the second event, wherein measured radio condition of the serving cell and/or the second neighbor cell is included or not omitted in the second measurement report.

15. The UE of claim 14, wherein the first neighbor cell and the second neighbor cell are the same cell.

16. The UE of claim 14, wherein the UE determines to include measured radio condition of a neighbor cell based on triggering of the measurement report.

17. The UE of claim 14, wherein the first measurement report and the second measurement report are differentiated based on triggering of the measurement report.

18. The UE of claim 11, wherein the processor is further configured to execute program code to determine to not include measured radio condition of a neighbor cell in a measurement report, wherein the measurement report is triggered by a location-based triggering event associated with the neighbor cell.

19. The UE of claim 11, wherein the processor is further configured to execute program code to transmit the first measurement report and/or the second measurement report to a network.

20. The UE of claim 11, wherein measured radio condition of the first neighbor cell is not included and measured radio condition of the serving cell is included in the first measurement report.

* * * * *